(12) United States Patent
Harushige et al.

(10) Patent No.: US 10,532,528 B2
(45) Date of Patent: *Jan. 14, 2020

(54) METHOD FOR PRODUCING V-RIBBED BELT

(71) Applicant: BANDO CHEMICAL INDUSTRIES, LTD., Kobe-shi, Hyogo (JP)

(72) Inventors: Naohisa Harushige, Kobe (JP); Kouichi Tsujino, Kobe (JP); Tomoaki Hata, Kobe (JP); Hideaki Kawahara, Kobe (JP); Hisashi Izumi, Kobe (JP); Yohei Hattori, Kobe (JP); Koichi Hosokawa, Kobe (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,940

(22) Filed: Sep. 28, 2018

(65) Prior Publication Data

US 2019/0030844 A1    Jan. 31, 2019

Related U.S. Application Data

(63) Continuation of application No. PCT/JP2017/006807, filed on Feb. 23, 2017.

(30) Foreign Application Priority Data

Mar. 30, 2016 (JP) .................. 2016-069514

(51) Int. Cl.
*B29D 29/10* (2006.01)
*F16G 5/06* (2006.01)
(Continued)

(52) U.S. Cl.
CPC ............ *B29D 29/103* (2013.01); *B29C 35/02* (2013.01); *B29D 29/10* (2013.01); *F16G 5/06* (2013.01);
(Continued)

(58) Field of Classification Search
CPC ...... B29D 29/10; B29D 29/103; B29D 29/08; F16G 5/06; F16G 5/08; B29C 47/0042
(Continued)

(56) References Cited

U.S. PATENT DOCUMENTS 4,359,355 A * 11/1982 Stecklein ............. B29D 29/106
156/138
4,395,298 A   7/1983 Wetzel et al.
(Continued)

FOREIGN PATENT DOCUMENTS

DE        1810928 A1     11/1970
DE    112015002411 T5     2/2017
(Continued)

*Primary Examiner* — Matthew J Daniels
*Assistant Examiner* — Yunju Kim
(74) *Attorney, Agent, or Firm* — Maschoff Brennan

(57) ABSTRACT

A shaped structure and a fabric material are set in a belt mold such that the shaped structure and the fabric material are respectively positioned inside and outside with respect to each other. While each of compression layer-forming portions comprised of ridges of the shaped structure covered with the fabric material is fitted in an associated one of compression layer-shaping grooves of the belt mold, the shaped structure is pressed toward the belt mold and heated to be crosslinked, and integrated with the fabric material, thereby molding a cylindrical belt slab. The belt slab is cut into ring-shaped pieces having two or more of the compression layer-forming portions.

22 Claims, 26 Drawing Sheets

(51) Int. Cl.
*F16G 5/08* (2006.01)
*F16G 5/20* (2006.01)
*B29C 35/02* (2006.01)
*B29K 9/00* (2006.01)
*B29K 105/00* (2006.01)
*B29K 105/24* (2006.01)
*B29K 307/04* (2006.01)

(52) U.S. Cl.
CPC ................. *F16G 5/08* (2013.01); *F16G 5/20* (2013.01); *B29K 2009/00* (2013.01); *B29K 2105/0038* (2013.01); *B29K 2105/0044* (2013.01); *B29K 2105/24* (2013.01); *B29K 2307/04* (2013.01)

(58) Field of Classification Search
USPC ..................... 156/138; 264/241, 49; 29/33 S
See application file for complete search history.

(56) References Cited

U.S. PATENT DOCUMENTS

| | | | |
|---|---|---|---|
| 4,617,075 A | 10/1986 | Wetzel et al. | |
| 7,305,744 B2* | 12/2007 | Hara | B29D 29/08 |
| | | | 29/33 S |
| 2003/0017900 A1* | 1/2003 | Kopang | B29D 29/00 |
| | | | 474/260 |
| 2003/0073533 A1* | 4/2003 | Knutson | B29D 29/08 |
| | | | 474/263 |
| 2009/0291796 A1* | 11/2009 | Mitsutomi | B29D 29/103 |
| | | | 474/252 |
| 2010/0167860 A1 | 7/2010 | Mori et al. | |
| 2010/0173740 A1 | 7/2010 | Mori et al. | |
| 2011/0028257 A1* | 2/2011 | Sealey | C08K 3/04 |
| | | | 474/263 |
| 2014/0103562 A1* | 4/2014 | Okubo | B29D 29/103 |
| | | | 264/49 |
| 2014/0135161 A1 | 5/2014 | Mori et al. | |
| 2014/0296011 A1* | 10/2014 | Yoshida | F16G 5/08 |
| | | | 474/261 |
| 2014/0364262 A1 | 12/2014 | Mori et al. | |
| 2017/0058996 A1 | 3/2017 | Kim et al. | |
| 2019/0084191 A1* | 3/2019 | Scholzen | B29C 70/541 |

FOREIGN PATENT DOCUMENTS

| | | |
|---|---|---|
| GB | 1251908 A | 11/1971 |
| JP | S62-188837 A | 8/1987 |
| JP | 2001-263432 A | 9/2001 |
| JP | 2004-162897 A | 6/2004 |
| JP | 2004-174772 A | 6/2004 |
| JP | 5717810 B2 | 5/2015 |

* cited by examiner

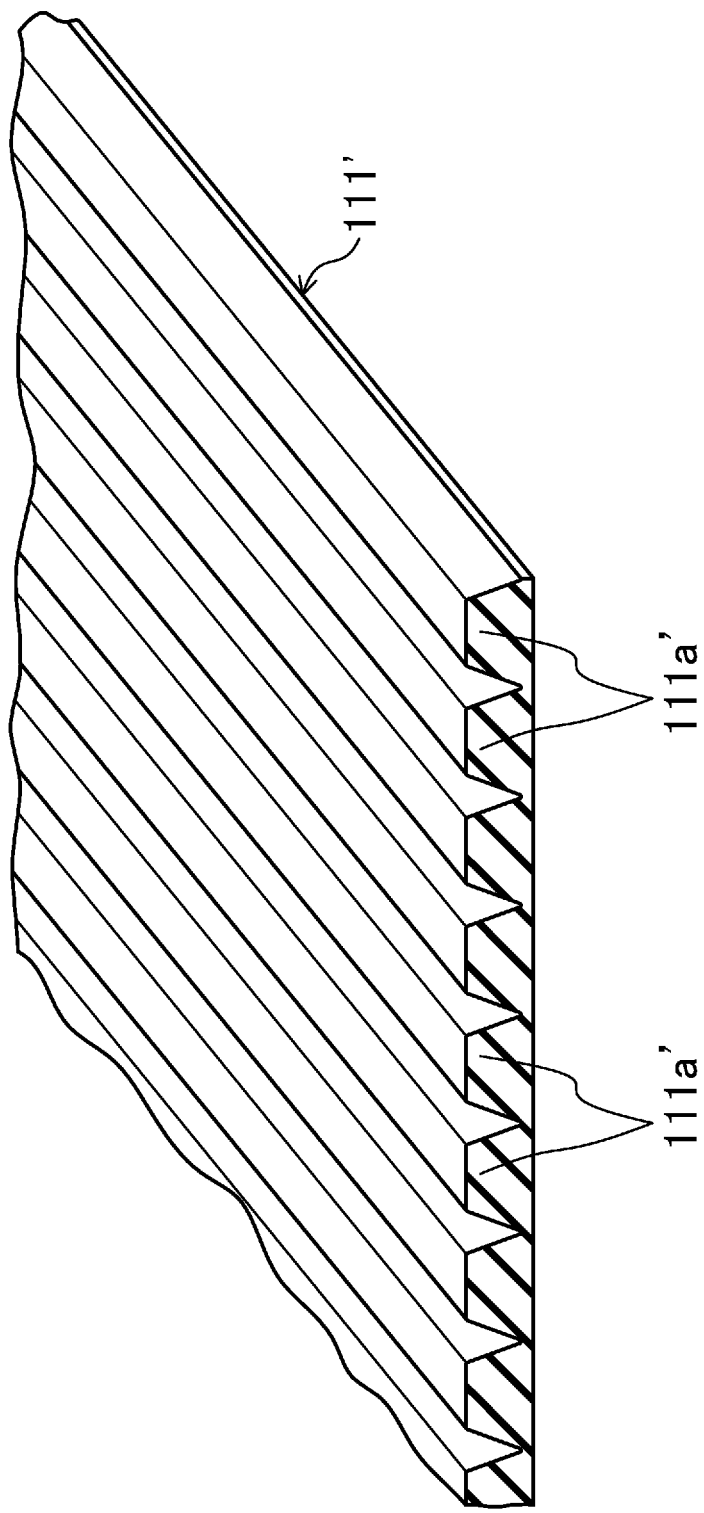

METHOD FOR PRODUCING V-RIBBED BELT

CROSS-REFERENCE TO RELATED APPLICATIONS

This is a continuation of International Application No. PCT/JP2017/006807 filed on Feb. 23, 2017, which claims priority to Japanese Patent Application No. 2016-069514 filed on Mar. 30, 2016. The entire disclosures of these applications are incorporated by reference herein.

BACKGROUND

The present disclosure relates to a method for producing a V-ribbed belt.

It has been known to produce, by using a molding method, a V-ribbed belt having rib surfaces covered with canvas which is stretchable in two predetermined directions, wherein a belt matrix permeates through the texture of the canvas (see, for example, Japanese Patent No. 5717810). In this molding method, the rib surfaces press the canvas arranged on the outer periphery of the belt matrix and the belt matrix onto a mold provided on the inner peripheral surface of a shell, and the belt matrix is then vulcanized and molded.

SUMMARY

However, according to the molding method as disclosed in Japanese Patent No. 5717810, a flat unvulcanized rubber sheet having canvas layered on a surface thereof is pressed onto a mold having a shape corresponding to multiple ribs and heated. Therefore, the ribs are formed while the tip ends of ribs of the mold push the canvas layered on the unvulcanized rubber sheet to locally stretch the canvas and the unvulcanized rubber is forced to flow. As a result, portions of the canvas that correspond to the bottoms of the ribs (i.e., the tip ends of the ribs of the mold) and have been locally and excessively stretched are caused to have roughened texture. The flowing unvulcanized rubber enters the roughened texture to seep to the surface of the resultant belt. As a result, the belt has an excessively high coefficient of friction, and generates a noise.

To solve the above problems involved in the molding method, it is necessary to use special canvas which includes polyurethane elastic yarn and is significantly contracted in advance so that its texture is not allowed to be roughened considerably even when the canvas is locally stretched. However, such canvas, which has a very special structure, requires a large number of process steps and incurs a high cost. In addition, since the polyurethane elastic yarn used in the special canvas has a low heat resistance, the polyurethane suffers thermal degradation at an early stage in a situation where the belt is used in a high temperature environment, causing early abrasion of the belt. Thus, use of the special canvas causes problems with respect to both costs and durability.

It is therefore an object of the present disclosure to provide a simple and low-cost method for producing a V-ribbed belt which includes V-shaped ribs having surfaces covered with a fabric material, in which seepage of rubber is reduced, and which generates substantially no noise.

To achieve the above object, the present disclosure is based on a method for producing a V-ribbed belt including a compression layer which forms an inner peripheral portion of the V-ribbed belt in a thickness direction of the V-ribbed belt and which has a plurality of V-shaped ribs extending in a longitudinal direction of the V-ribbed belt and arranged in a width direction of the V-ribbed belt, the plurality of V-shaped ribs having a friction drive surface covered with a covering fabric.

A method for producing a V-ribbed belt according to a first aspect includes:

setting a shaped structure and a fabric material which is to constitute the covering fabric in a belt mold such that the shaped structure and the fabric material are respectively positioned inside and outside with respect to each other, the shaped structure having a cylindrical shape, being made of an uncrosslinked rubber composition, and including, on an outer peripheral surface thereof, a plurality of ridges extending in a circumferential direction and arranged adjacent to one another in an axial direction of the shaped structure, the belt mold including a plurality of compression layer-shaping grooves arranged in a groove width direction;

molding a cylindrical belt slab by crosslinking the shaped structure set in the belt mold through heating and pressing the shaped structure toward the belt mold, while each of compression layer-forming portions is fitted in an associated one of the compression layer-shaping grooves of the belt mold, the compression layer-forming portions being comprised of the plurality of ridges, of the shaped structure, each covered with the fabric material and together forming the compression layer, the crosslinking involving integration of the shaped structure with the fabric material; and cutting the belt slab into ring-shaped pieces each including two or more of the plurality of compression layer-forming portions that are to constitute the plurality of V-shaped ribs.

With this feature, the shaped structure that has a cylindrical shape and includes the plurality of ridge which have been formed adjacent to one another in the axial direction in advance so as to constitute the plurality of V-shaped ribs of the compression layer, and the fabric material that is to constitute the covering fabric are affixed together to mold the belt slab, and the belt slab is cut into ring-shaped pieces having two or more of the compression layer-forming portions. Therefore, according to the method of the present disclosure, the ribs are formed in a manner different from the methods of the known art in which an uncrosslinked rubber sheet having canvas layered on a surface thereof is pressed onto a mold having a shape corresponding to multiple ribs and heated, and the tip ends of ribs of the mold push the canvas to locally stretch the canvas. Thus, the method of the present disclosure does not require use of special canvas.

The belt mold may have a cylindrical shape having, on an inner peripheral surface thereof, the plurality of compression layer-shaping grooves extending in a circumferential direction and arranged adjacent to one another in an axial direction of the belt mold, and the shaped structure may be placed in the belt mold. This feature allows the entire shaped structure to be crosslinked at once, making the crosslinking step very simple.

Prior to the setting the shaped structure and the fabric material in the belt mold, the ridges may be covered with the fabric material, thereby forming the compression layer-forming portions.

With this feature, the ridges of the uncrosslinked rubber that have been formed in advance are covered with the canvas. Consequently, grooves between the ridges stretch the entire canvas, which can be freely stretched, and then, the canvas is affixed to the grooves between the ridges. This substantially prevents the canvas from being stretched locally only in the grooves between the ridges, enabling the canvas to be affixed while being stretched a little and uniformly. In addition, since the uncrosslinked rubber already has ridges corresponding to the shapes of ribs, almost no flow occurs in the uncrosslinked rubber when the canvas is affixed. Thus, the rubber is substantially prevented from seeping through roughed texture of the canvas to the surface. Thus, a simply-configured and inexpensive canvas which has a small stretchability can be used.

Before the ridges are covered with the fabric material, the fabric material may be shaped to have a corrugated cross section having same pitches as those of the ridges, and then, disposed such that portions of the fabric material protruding toward the ridges are positioned at grooves between the ridges.

With this feature, it can be ensured that the fabric material is set sufficiently loosely. Thus, inexpensive canvas having a smaller stretchability can be used.

The fabric material which originally has a flat shape may be continuously passed between a pair of plate-shaped or rolled members configured to pleat the fabric material, so that pitches of the fabric material pleated gradually decrease in a length direction.

With this feature, the fabric material can be reliably shaped to fit the surfaces of the ridges in a simple manner.

Before the ridges are covered with the fabric material, the fabric material may be shaped to fit surfaces of the ridges.

With this feature, since the fabric material is shaped to fit the surfaces of the ridges, local stretch of the fabric material can be reduced to a small amount, enabling production of a V-ribbed belt in which seepage of rubber through the covering fabric is reduced.

The setting the shaped structure and the fabric material in the belt mold may be carried out such that the compression layer-forming portions are fitted in the compression layer-shaping grooves.

With this feature, fitting the compression layer-forming portions in the compression layer-shaping grooves in advance reduces flow in the rubber, thereby enabling the production of the V-ribbed belt having a stable structure.

The shaped structure may be pressed toward the belt mold by expanding an expansion sleeve disposed inward of the shaped structure and by causing the expansion sleeve to press the shaped structure from inside.

A tensile member may be provided between the shaped structure and the expansion sleeve, the tensile member being comprised of an uncrosslinked rubber composition formed into a cylindrical shape and having a cord embedded therein and forming a helical pattern with pitches in an axial direction of the tensile member.

The tensile member may be provided on the expansion sleeve before the expansion sleeve is expanded.

A gap may be provided between the tensile member and the expansion sleeve before the expansion sleeve is expanded.

The shaped structure and the tensile member may be brought into contact with each other before the expansion sleeve is expanded.

A gap may be provided between the shaped structure and the tensile member before the expansion sleeve is expanded.

The present disclosure provides a simple and low-cost method for producing a V-ribbed belt in which stretch of a fabric material and seepage of rubber are reduced, and which generates substantially no noise.

BRIEF DESCRIPTION OF THE DRAWINGS

FIG. 2 is a perspective view of a core rubber sheet for use in the first production method.

DETAILED DESCRIPTION

Embodiments will be described below in detail with reference to the drawings.

Figure 1:
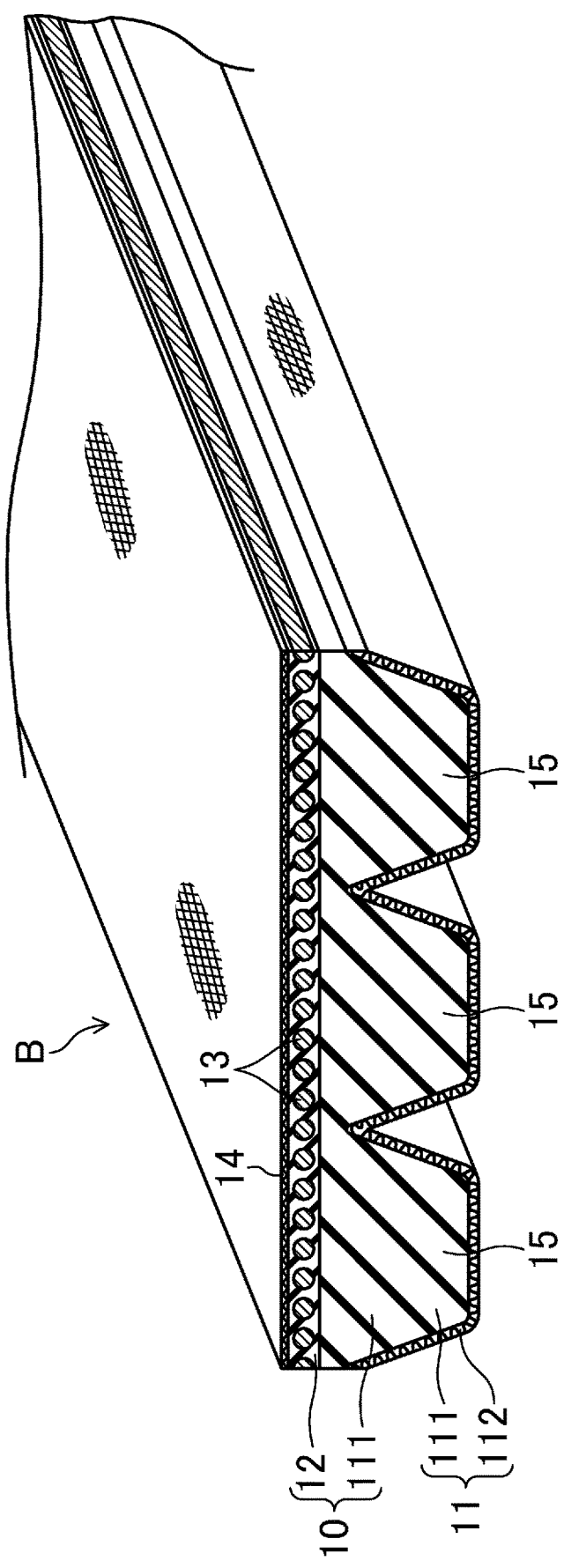
FIG. 1 is a perspective view of a V-ribbed belt produced by a production method according to an embodiment.

FIG. 1 shows a V-ribbed belt B produced by a production method according to an embodiment. The V-ribbed belt B is usable as a power transmission member for various machines. For example, the V-ribbed belt B has a length of 700 mm to 3000 mm, a width of 10 mm to 36 mm, and a thickness of 4.0 mm to 5.0 mm.

The V-ribbed belt B of this embodiment is comprised of a rubber-made belt body 10 including a core rubber layer 111 which forms an inner peripheral portion of the belt B and an adhesive rubber layer 12 which forms an outer peripheral portion of the belt B. The inner and outer peripheral portions face each other in the thickness direction of the belt B. The core rubber layer 111 has a surface covered with a covering fabric 112. The core rubber layer 111 and the covering fabric 112 form a compression layer 11 including a plurality of V-shaped ribs 15 which extend in the longitudinal direction on the inner peripheral side of the belt in the thickness direction and are arranged side-by-side in the belt width direction. A cord 13 is embedded in a middle portion, in the thickness direction, of the adhesive rubber layer 12. The cord 13 forms, in the adhesive rubber layer 12, a helical pattern having pitches in the width direction. A reinforcing fabric 14 is attached to the outer peripheral side of the adhesive rubber layer 12, i.e., the back face of the belt.

The compression layer 11 has the plurality of V-shaped ribs 15 that form a pulley contacting portion and protrude away from the outer peripheral side of the belt. Each of the plurality of V-shaped ribs 15 has the shape of a ridge extending in the belt length direction and having an approximately inverted triangular cross-section. The V-shaped ribs 15 are arranged parallel to one another in the belt width direction. Each V-shaped rib 15 has, for example, a height of 2.0 mm to 3.0 mm, and a width of 1.0 mm to 3.6 mm at the rib base end. The number of the ribs ranges, for example, from 3 to 6 (3 ribs in FIG. 1).

The core rubber layer 111 and the adhesive rubber layer 12 are each made of a crosslinked rubber composition, which is produced by crosslinking, through heating and pressurization, an uncrosslinked rubber composition prepared by kneading a rubber component and various compound ingredients together. The core rubber layer 111 and the adhesive rubber layer 12 may be made of the same rubber composition.

Examples of the rubber component include ethylene-α-olefin elastomer (such as EPDM and EPR), chloroprene rubber (CR), chlorosulfonated polyethylene rubber (CSM), and hydrogenated acrylonitrile-butadiene rubber (H-NBR). One of these substances or a blend of two or more of these substances is suitably used as the rubber component. Examples of the compound ingredients include a reinforcing material (such as carbon black), a filler, a plasticizer, a processing aid, a crosslinking agent, a co-crosslinking agent, a vulcanization accelerator, a vulcanization accelerator aid, and an antioxidant.

The covering fabric 112 is comprised of a woven, knitted, or unwoven fabric made of nylon fibers, polyester fibers, aramid fibers, or cotton, for example. In a preferred embodiment, the covering fabric 112 is highly stretchable. An adhesion treatment may be provided to the covering fabric 112 to make the covering fabric 112 adhesive to the core rubber layer 111 of the belt body 10.

The cord 13 is made of a twisted yarn of fibers, such as polyester fibers, polyethylene naphthalate fibers, aramid fibers, and vinylon fibers. The cord 13 has undergone an adhesion treatment to be adhesive to the adhesive rubber layer 12 of the belt body 10.

The reinforcing fabric 14 is comprised of a woven, knitted, or unwoven fabric made of nylon fibers, polyester fibers, aramid fibers, or cotton, for example. The reinforcing fabric 14 has undergone an adhesion treatment to be adhesive to the adhesive rubber layer 12 of the belt body 10.

(First Production Method)

A first production method of the V-ribbed belt B according to the embodiment will be described with reference to FIGS. 2 to 9.

The first production method includes a component preparation step, a shaping step, a crosslinking step, and a finishing step.

<Component Preparation Step>

In the component preparation step, a core rubber sheet 111' which is to constitute a core rubber layer 111, a fabric material 112' which is to constitute a covering fabric 112, an adhesive rubber sheet 12' which is to constitute an adhesive rubber layer 12, a cord 13', and a reinforcing fabric 14' are prepared.

—Core Rubber Sheet 111'—

A rubber component and compound ingredients are kneaded together by using a kneading machine such as a kneader or a Banbury mixer to obtain an uncrosslinked rubber composition. The uncrosslinked rubber composition is molded by calender molding or the like, into a thick uncrosslinked rubber sheet 111''. The core rubber sheet 111' is then prepared from the uncrosslinked rubber sheet 111''.

FIG. 2 shows the core rubber sheet 111'.

The core rubber sheet 111' has, on one surface, core rubber layer-forming portions 111a' which are each comprised of a linearly-extending ridge and which extend parallel to, and adjacent to, one another. The core rubber sheet 111' is formed into a shape which looks like a collection of a plurality of core rubber layers 111 each forming part of a V-ribbed belt B to be produced, wherein the core rubber layers 111 are arranged side by side and connected together such that adjacent core rubber layers 111 are coupled to each other at the sides. Thus, the core rubber layer-forming portions 111a' have the same shape. Each core rubber layer-forming portion 111a' has a width decreasing toward its distal end. Specifically, each core rubber layer-forming portion 111a' is shaped to have a cross section in an isosceles trapezoidal shape.

Figure 3A:
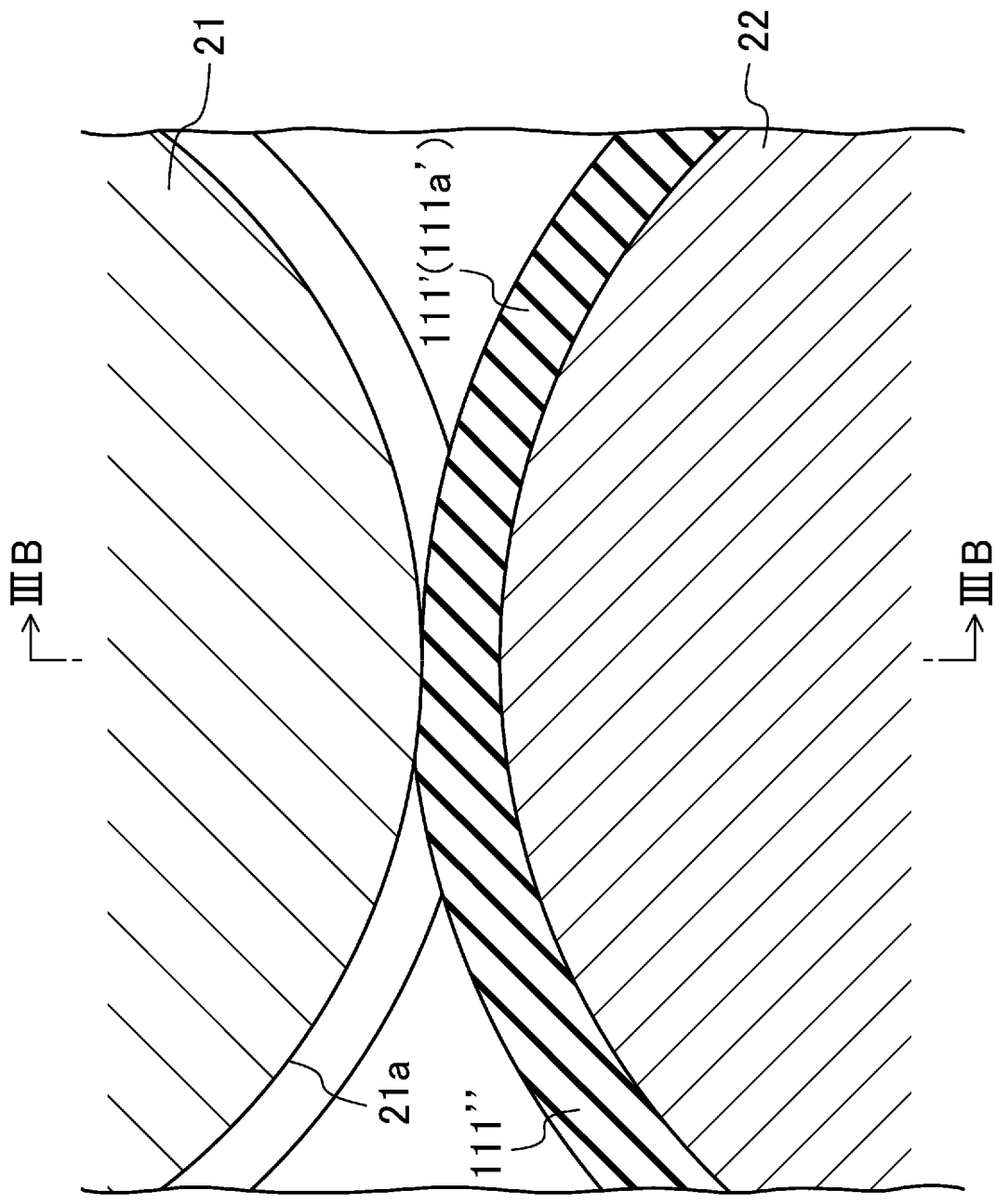
FIG. 3A shows how a core rubber sheet is prepared in a component preparation step in a first production method of the first embodiment.
Figure 3B:
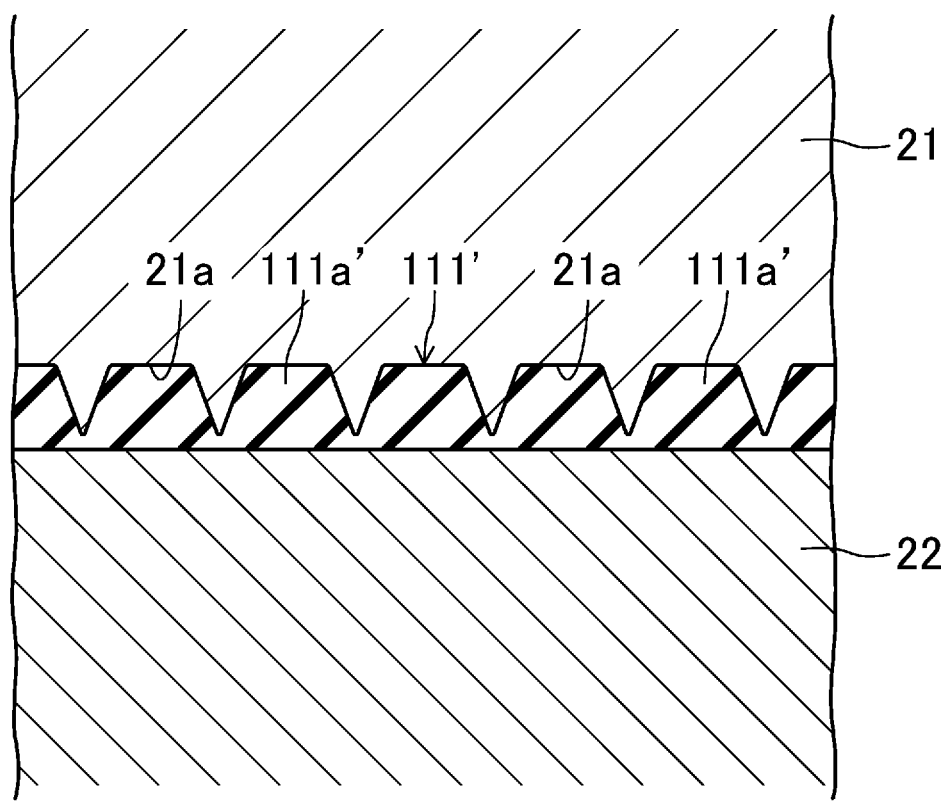
FIG. 3B is a cross-sectional view taken along line IIIB-IIIB of FIG. 3A.

The core rubber sheet 111' can be prepared in the following manner. As shown in FIGS. 3A and 3B, the uncrosslinked rubber sheet 111'' is passed between a flat roll 22 and a core rubber-shaping roll 21 having trapezoidal grooves 21a that have a shape corresponding to the shape of the core rubber layer-forming portions 111a' of the core rubber sheet 111', extend in the circumferential direction, and are arranged adjacent to one another in the axial direction of the core rubber-shaping roll 21. In this manner, the trapezoidal grooves 21a on the outer peripheral surface of the core rubber-shaping roll 21 are pressed onto one of the surfaces of the uncrosslinked rubber sheet 111'', thereby forming the core rubber layer-forming portions 111a'. The uncrosslinked rubber sheet 111'' may be heated to increase the plasticity of the uncrosslinked rubber sheet 111''. The core rubber sheet 111' can also be prepared by press molding or extrusion molding.

—Fabric Material 112'—

A woven fabric or a fabric of any other type which is to serve as the fabric material 112' undergoes, as necessary, one kind or two or more kinds of the following treatments: an adhesion treatment in which the woven fabric is soaked in an epoxy resin solution or an isocyanate resin solution and heated; an adhesion treatment in which the woven fabric is soaked in an RFL aqueous solution and heated; an adhesion treatment in which the woven fabric is soaked in rubber cement and dried; and an adhesion treatment in which rubber cement is applied to a surface of the woven fabric which will face the core rubber layer 111 and dried.

—Adhesive Rubber Sheet 12'—

A rubber component and compound ingredients are kneaded together by using a kneading machine such as kneader or a Banbury mixer to obtain an uncrosslinked rubber composition. The uncrosslinked rubber composition is molded by calender molding or the like, into a sheet, i.e., the adhesive rubber sheet 12'.

—Cord 13'—

A twisted yarn to form a cord 13' undergoes an adhesion treatment in which the twisted yarn is soaked in an RFL aqueous solution and heated, and/or an adhesion treatment in which the twisted yarn is soaked in rubber cement and dried. The twisted yarn may undergo, prior to these adhesion treatments, a base treatment in which the twisted yarn is soaked in an epoxy resin solution or an isocyanate resin solution and heated.

—Reinforcing Fabric 14'—

A woven fabric or a fabric of any other type which is to serve as a reinforcing fabric 14 undergoes one kind or two or more kinds of the following treatments: an adhesion treatment in which the fabric is soaked in an RFL aqueous solution and heated; an adhesion treatment in which the fabric is soaked in rubber cement and dried; and an adhesion treatment in which rubber cement is applied to a surface of the fabric which will face the belt body 10 and dried. The fabric may undergo, prior to these adhesion treatments, a base treatment in which the fabric is soaked in an epoxy resin solution or an isocyanate resin solution and heated. In the case where a stretch rubber layer is provided instead of the reinforcing fabric 14', a stretch rubber sheet to constitute the stretch rubber layer is prepared in a manner similar to that for the adhesive rubber sheet 12'.

<Shaping Step>

Figure 4A:
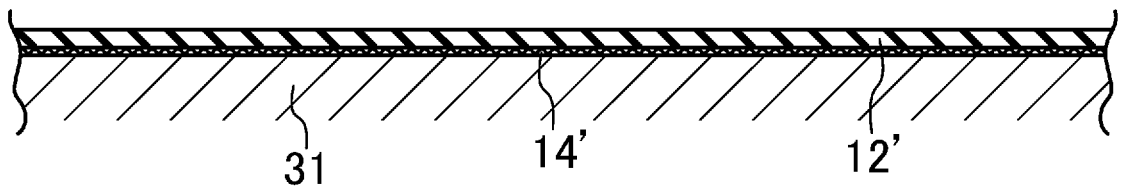
FIG. 4A is a first drawing showing a shaping step of the first production method.

In the shaping step, first, a shaping mandrel 31 having a cylindrical shape is rotatably supported on a shaft of a shaping machine (not shown) such that the axis of the shaping mandrel 31 extends horizontally. As shown in FIG. 4A, a reinforcing fabric 14' is wrapped around the shaping mandrel 31, and then, the adhesive rubber sheet 12' is wrapped around the reinforcing fabric 14'. The shaping mandrel 31 is chosen so as to correspond to the length of the V-ribbed belt B to be produced. In this step, the adhesive rubber sheet 12' is stacked on the reinforcing fabric 14'. Each of the reinforcing fabric 14' and the adhesive rubber sheet 12' is cut with ultrasound, a cutter, scissors, or the like, and its ends are lap jointed together. A reinforcing fabric 14' having a predetermined length may be formed into a cylindrical shape with its both ends joined together, and this cylindrical reinforcing fabric 14' may be fitted over the shaping mandrel 31. Alternatively, a reinforcing fabric 14' and an adhesive rubber sheet 12' may be stacked on and integrated with each other into a layered structure, and then, this layered structure may be wrapped around the shaping mandrel 31. Alternatively, the layered structure having a predetermined length may be formed into a cylindrical shape through joining of its both ends such that the adhesive rubber layer 12 faces outside, and the resultant cylindrical structure may be fitted over the shaping mandrel 31. In the case of providing a stretch rubber layer, a stretch rubber sheet is used instead of the reinforcing fabric 14', and the shaping step is carried out in a similar manner.

Figure 4B:
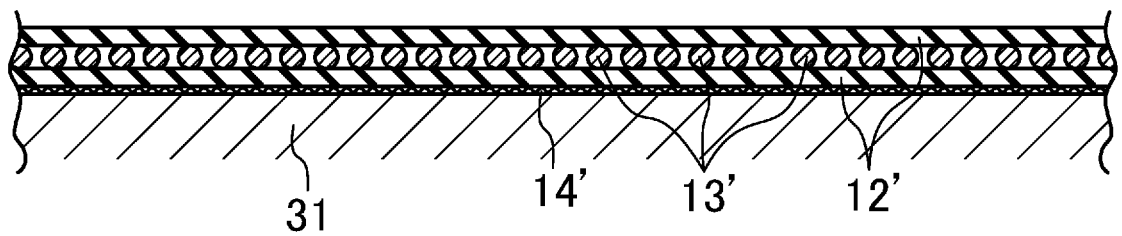
FIG. 4B is a second drawing showing the shaping step of the first production method.

Subsequently, as shown in FIG. 4B, the cord 13' is helically wound around the adhesive rubber sheet 12'. Another adhesive rubber sheet 12' is then wrapped over the wound cord 13'. At this time, a layer of the cord 13' is stacked on the adhesive rubber sheet 12', and the other adhesive rubber sheet 12' is stacked on the layer of the cord 13'. The adhesive rubber sheet 12' is cut with ultrasound, a cutter, scissors, or the like, and its ends are lap jointed together.

Figure 4C:
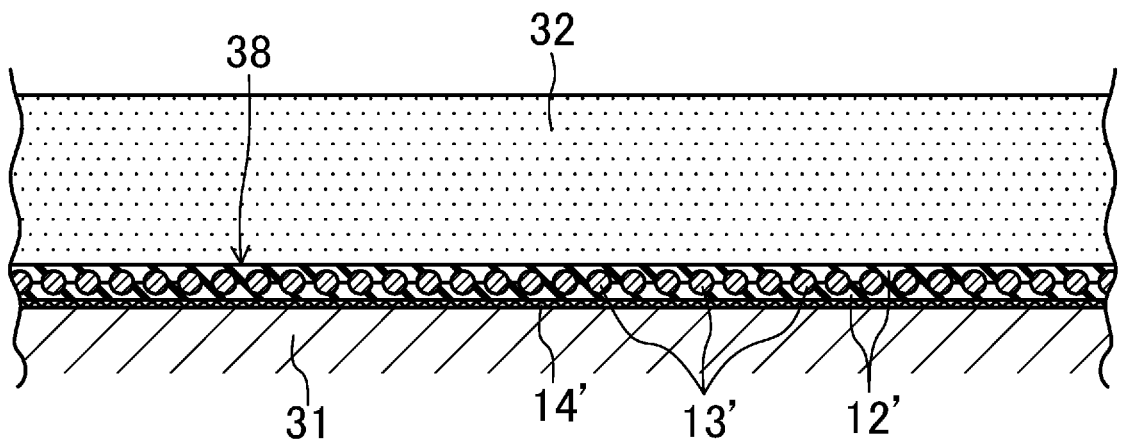
FIG. 4C is a third drawing showing the shaping step of the first production method.

Next, as shown in FIG. 4C, the entire periphery of the adhesive rubber sheet 12' is pressed with a roller 32. At this time, the rubber flows and enters between turns of the cord 13', and the cord 13' is embedded between the pair of adhesive rubber sheets 12' so as to be fixed in position. As a result, these components are all integrated into a cylindrical tensile member 38. This operation may be carried out simultaneously with wrapping the adhesive rubber sheet 12' around the layer of the cord 13'.

Figure 4D:
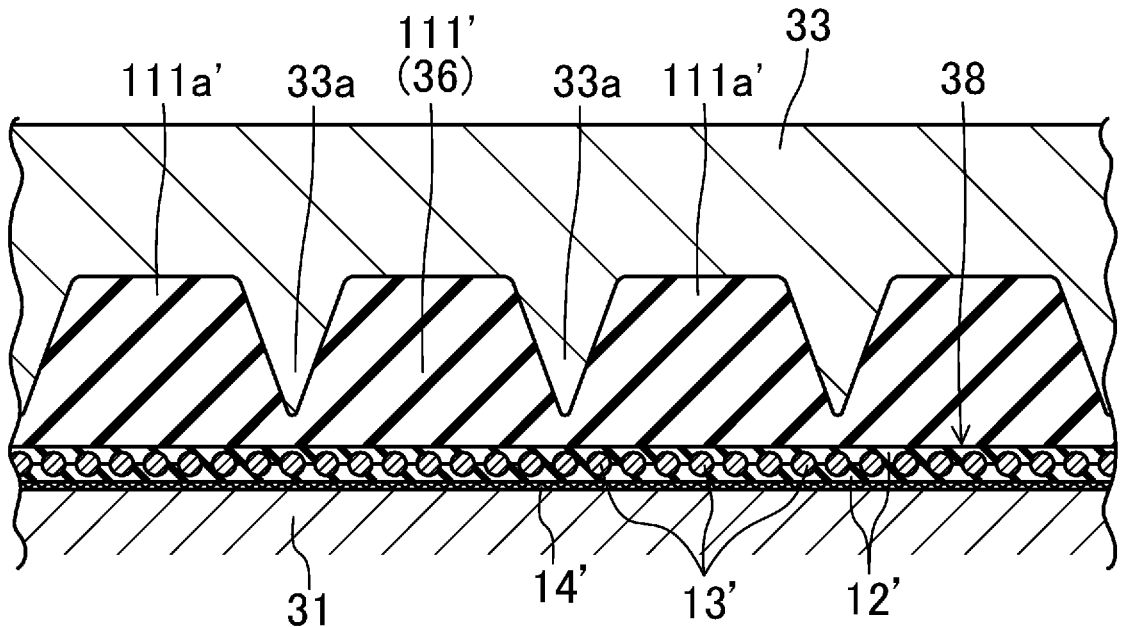
FIG. 4D is a fourth drawing showing the shaping step of the first production method.

Next, as shown in FIG. 4D, the core rubber sheet 111' is wrapped around the adhesive rubber sheet 12' of the tensile member 38 such that the core rubber layer-forming portions 111a' face outside and extend in the circumferential direction. At this time, a first comb-shaped guide 33 having a shape corresponding to the core rubber layer-forming portions 111a' of the core rubber sheet 111' is set outside the shaping mandrel 31 such that the guide 33 extends in the axial direction and comb teeth 33a of the guide 33 face the shaping mandrel 31. Each of the core rubber layer-forming portions 111a' of the core rubber sheet 111' is guided between an associated pair of the comb teeth 33a, and the core rubber sheet 111' is wrapped around, and stacked on, the adhesive rubber sheet 12' with the core rubber layer-forming portions 111a' extending in the circumferential direction with precision. The core rubber sheet 111' is cut with ultrasound, a cutter, scissors, or the like, and its ends are butt jointed. To increase the joint strength, the butt joint is suitably achieved by abutting surfaces, of the core rubber sheet 111', which are oblique with respect to the thickness direction of the core rubber sheet 111'. A core rubber sheet 111' having a predetermined length may be formed into a cylindrical shape with its both ends joined together such that the core rubber layer-forming portions 111a' face outside, and this cylindrical core rubber sheet 111' may be fitted over the adhesive rubber sheet 12'.

Figure 4E:
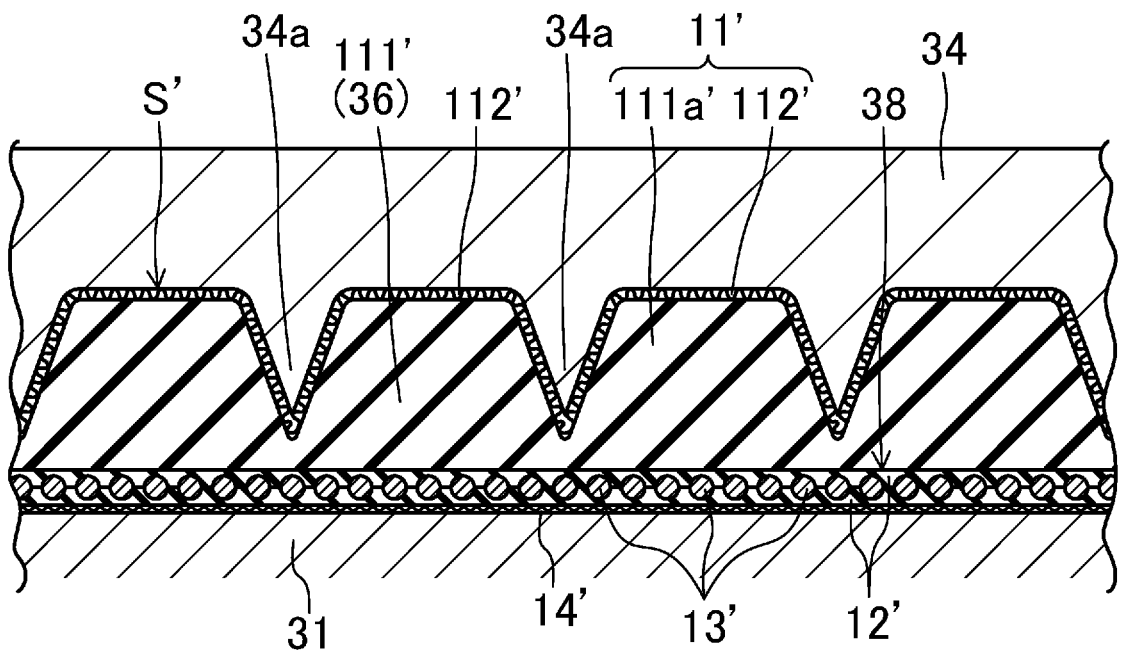
FIG. 4E is a fifth drawing showing the shaping step of the first production method.

Then, as shown in FIG. 4E, the fabric material 112' is wrapped around the core rubber sheet 111'. In this process, instead of the first guide 33, a second comb-shaped guide 34 having a shape which leaves a gap corresponding to the thickness of the fabric material 112' between itself and the core rubber sheet 111' is set such that the second guide 34 extends in the axial direction and such that comb teeth 34a of the second guide 34 face the shaping mandrel 31. Thus, the fabric material 112' is forced into the gap between the core rubber sheet 111' and the second guide 34, and wraps around and covers the surface of the core rubber sheet 111' to be stacked on the core rubber sheet 111'.

Figure 4F:
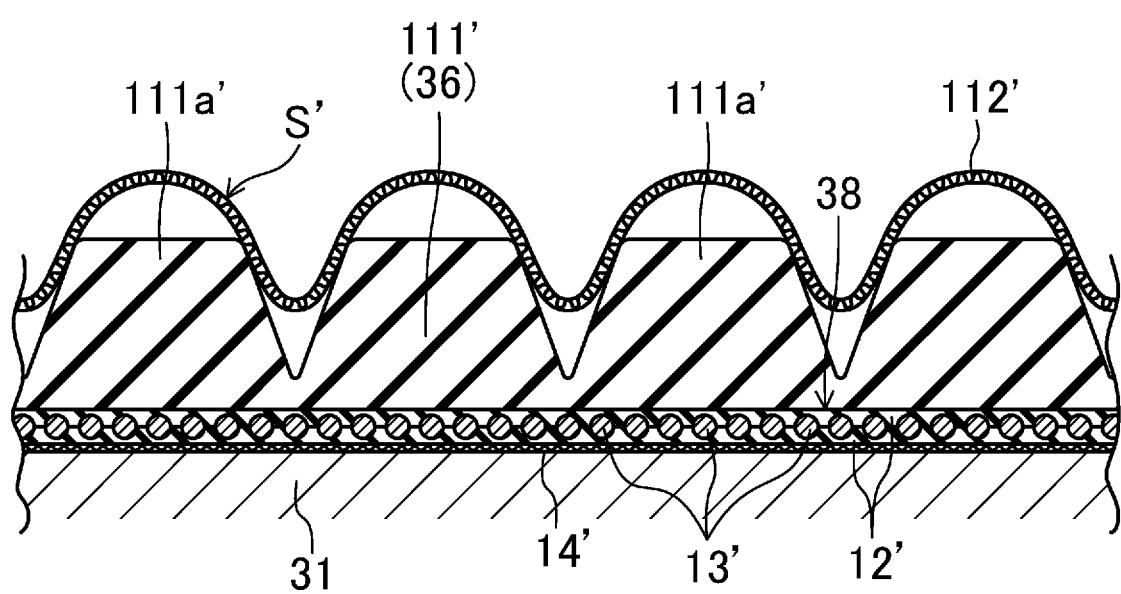
FIG. 4F is a sixth drawing showing the shaping step of the first production method.

Covering the surface of the core rubber sheet 111' with the fabric material 112' in advance in this manner can substantially prevent the fabric material 112' from being stretched locally and significantly. This can substantially prevent seepage of rubber which may occur through a portion stretched locally and significantly, and consequently, an abnormal noise which may be generated during running of the belt. In order to reduce local stretch of the fabric material 112' to a small amount, it is also preferable that: the fabric material 112' is subjected to a pleating process so that the cross section in the width direction is corrugated to have the same pitches as those of the core rubber layer-forming portions 111a' as shown in FIG. 4F, prior to covering the surface of the core rubber sheet 111' with the fabric material 112' using the second guide 34; the corrugated fabric material 112' is then set such that its portions protruding toward the core rubber sheet 111' (the core rubber layer-forming portions 111a') are positioned at grooves between the core rubber layer-forming portions 111a' of the core rubber sheet 111'; and the protruding portions are halfway fitted in the grooves so that the fabric material 112' loosely fits the core rubber sheet 111'. Such a pleating process may include continuously passing the fabric material 112', which originally has a flat shape, between a pair of plate-shaped or rolled members configured to pleat the fabric material 112'. In this process, the fabric material 112' is preferably pleated such that pitches of the pleated shape gradually decrease in a length direction. This pleating process allows an inexpensive fabric which has a smaller stretchability to be used as the fabric material 112' for the present disclosure.

The fabric material 112' may be closely fitted to the core rubber sheet 111' (the core rubber layer-forming portions 111a') like a single sheet, or may simply lie along the surface of the core rubber sheet 111' instead of being closely fitted. Ends of the fabric material 112' are butt jointed, lap jointed, or jointed, on an underlying layer, with a space between the ends. Alternatively, the fabric material 112' may be layered on the core rubber sheet 111' in the following manner: the fabric material 112' having a predetermined length is formed into a cylindrical shape with both ends jointed together; the thus obtained cylindrical fabric material 112' is fitted over the core rubber sheet 111' using the second guide 34 so that the entire peripheral surface of the core rubber sheet 111' is covered with the fabric material 112'.

In the manner described above, an uncrosslinked slab S' having a cylindrical shape is formed on the shaping mandrel 31. Thus, the uncrosslinked slab S' includes the reinforcing fabric 14', the adhesive rubber sheet 12', the cord 13', the other adhesive rubber sheet 12', the core rubber sheet 111', and the fabric material 112' that are sequentially stacked toward the outside. The uncrosslinked slab S' includes the core rubber sheet 111' formed into a cylindrical shape, i.e., a shaped structure 36 which has a cylindrical shape. The shaped structure 36 is made of the uncrosslinked rubber composition and has, on its outer peripheral surface, the core rubber layer-forming portions 111a' that are comprised of the plurality of ridges extending in the circumferential direction and that are arranged adjacent to one another in the axial direction. In the uncrosslinked slab S', the plurality of core rubber layer-forming portions 111a' of the shaped structure 36 that are each covered with the fabric material 112' form compression layer-forming portions 11' that are to constitute the compression layer 11. The number of the compression layer-forming portions 11' included in the uncrosslinked slab S' is 20 to 100, for example.

<Crosslinking Step>

Figure 5A:
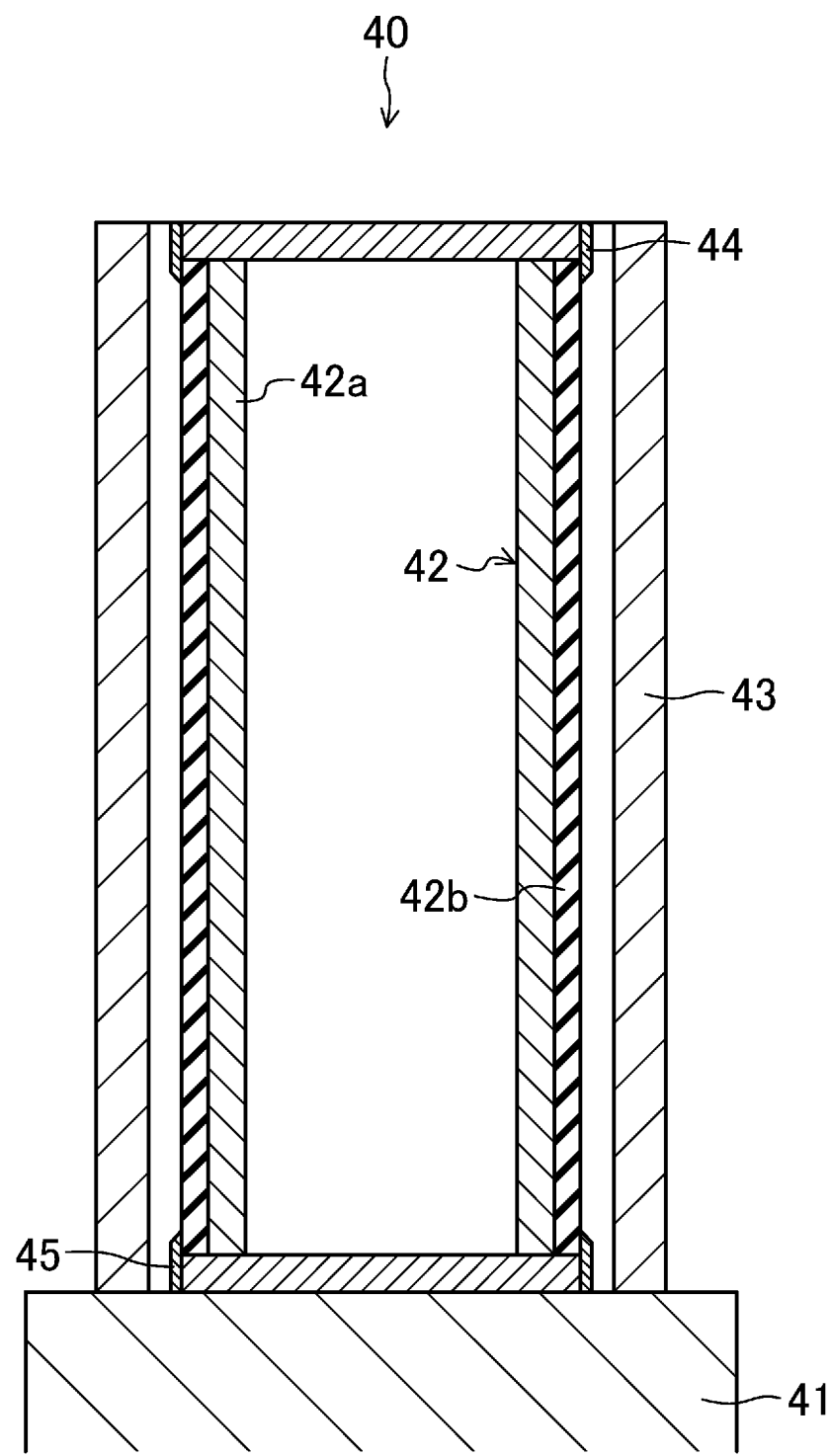
FIG. 5A is a cross-sectional view of a crosslinking apparatus.
Figure 5B:
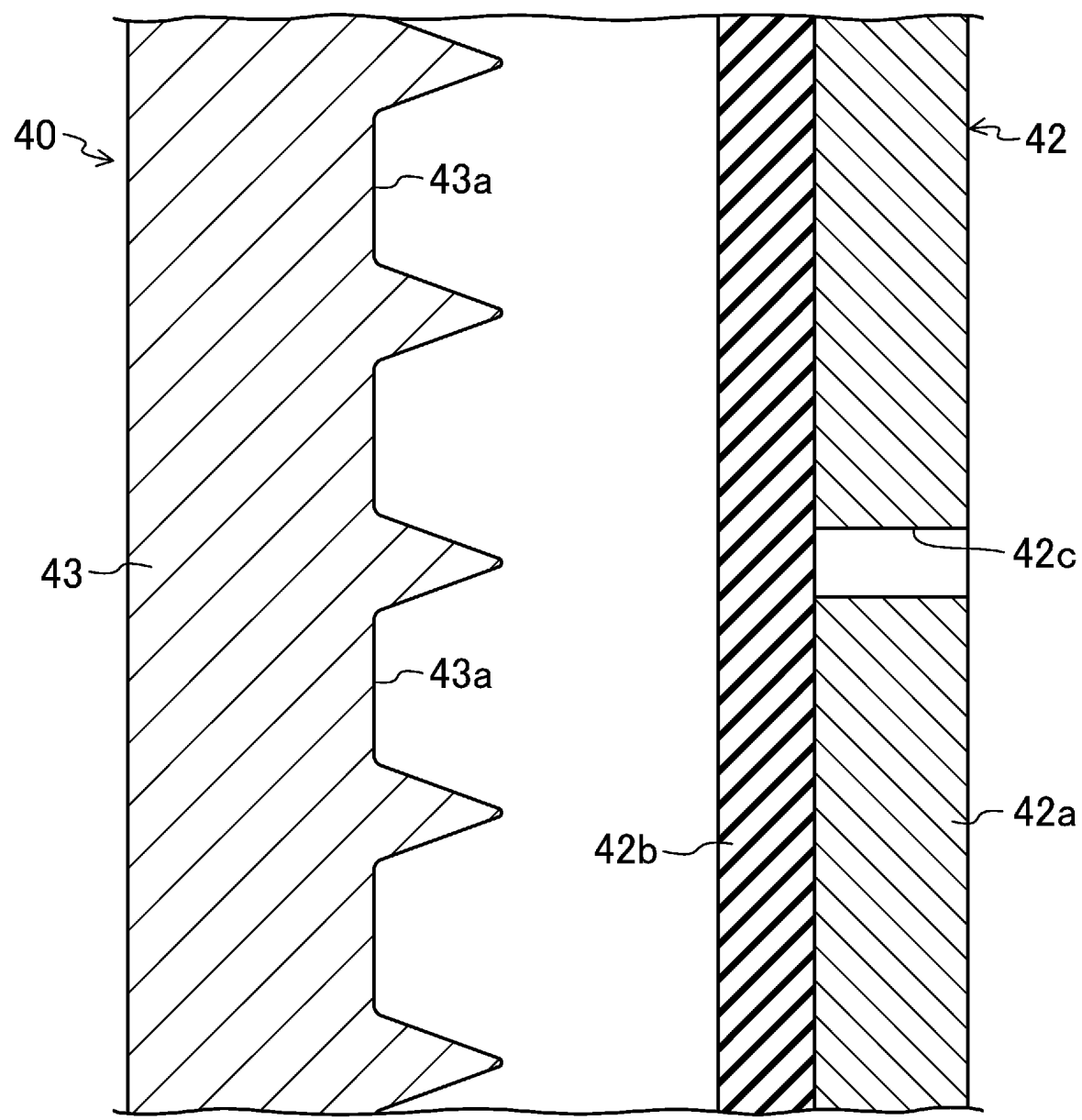
FIG. 5B shows, on an enlarged scale, a cross section of a portion of the crosslinking apparatus.

FIGS. 5A and 5B illustrate a crosslinking apparatus 40 for use in a crosslinking step.

The crosslinking apparatus 40 includes a base 41, a columnar expansion drum 42 standing on the base 41, a cylindrical mold 43 (belt mold) provided outside the expansion drum 42, and fixing rings 44 and 45 provided respectively on the top and the bottom of the expansion drum 42.

The expansion drum 42 includes a drum body 42a having a hollow columnar shape, and a cylindrical expansion sleeve 42b made of rubber and externally fitted over the outer periphery of the drum body 42a. The drum body 42a has, in its peripheral wall, a large number of air-passage holes 42c communicating with the inside. A space between the expansion sleeve 42b and the drum body 42a is sealed by the fixing rings 44 and 45 at both ends of the expansion sleeve 42b. The crosslinking apparatus 40 includes a pressurizing means (not shown) for applying a pressure by introducing high-pressure air into the drum body 42a. The high-pressure air introduced into the drum body 42a by the pressurizing means passes through the air-passage holes 42d to enter the space between the drum body 42a and the expansion sleeve 42b, and inflates the expansion sleeve 42b radially outward.

The cylindrical mold 43 is attachable to, and detachable from, the base 41. The cylindrical mold 43 is attached to the base 41 such that the cylindrical mold 43 and the expansion drum 42 are arranged concentrically with each other with a space interposed therebetween. The cylindrical mold 43 has, on its inner peripheral surface, a plurality of compression layer-shaping grooves 43a which extend in the circumferential direction and are arranged adjacent to one another in the axial direction of the cylindrical mold 43. Each compression layer-shaping groove 43a tapers toward its groove bottom. Specifically, each compression layer-shaping groove 43a has the same isosceles trapezoidal cross section as the core rubber layer 111 of the V-ribbed belt B to be produced. The crosslinking apparatus 40 includes a heating means and a cooling means (both are not shown) for the cylindrical mold 43, so that the temperature of the cylindrical mold 43 can be controlled by these heating and cooling means.

In the crosslinking step, the uncrosslinked slab S' is removed from the shaping mandrel 31, and then, set in the cylindrical mold 43 of the crosslinking apparatus 40, which has been previously detached from the base 41. More specifically, the uncrosslinked slab S' is set in the cylindrical mold 43 such that each of the plurality of compression layer-forming portions 11' of the uncrosslinked slab S' (the core rubber layer-forming portions 111a' covered with the fabric material 112') is fitted in an associated one of the compression layer-shaping grooves 43a. Fitting the compression layer-forming portions 11' in the compression layer-shaping grooves 43a in advance reduces flow in the rubber, thereby enabling the production of the V-ribbed belt B having a stable structure. At this time, the shaped structure 36 and the fabric material 112' are set in the cylindrical mold 43 such that the shaped structure 36 and the fabric material 112' are positioned respectively inside and outside with respect to each other. The cylindrical mold 43 is chosen to correspond to the length of the V-ribbed belt B to be produced. Note that short fibers, resin powder, or the like may be attached to the inner peripheral surface of the cylindrical mold 43 and/or the outer peripheral surface of the uncrosslinked slab S' in advance.

Subsequently, as shown FIG. 6A, the cylindrical mold 43 within which the uncrosslinked slab S' has been set is attached to the base 41 such that the cylindrical mold 43 covers the expansion drum 42. This means that the tensile member 38, which is comprised of an uncrosslinked rubber composition shaped into a cylindrical shape in which the cord 13' is embedded so as to form a helical pattern having pitches in the axial direction, is placed between the shaped structure 36 and the expansion sleeve 42b of the expansion drum 42. Before expansion of the expansion sleeve 42b, a gap is interposed between the tensile member 38 and the expansion sleeve 42b, and the shaped structure 36 and the tensile member 38 are in contact with each other.

Figure 6A:
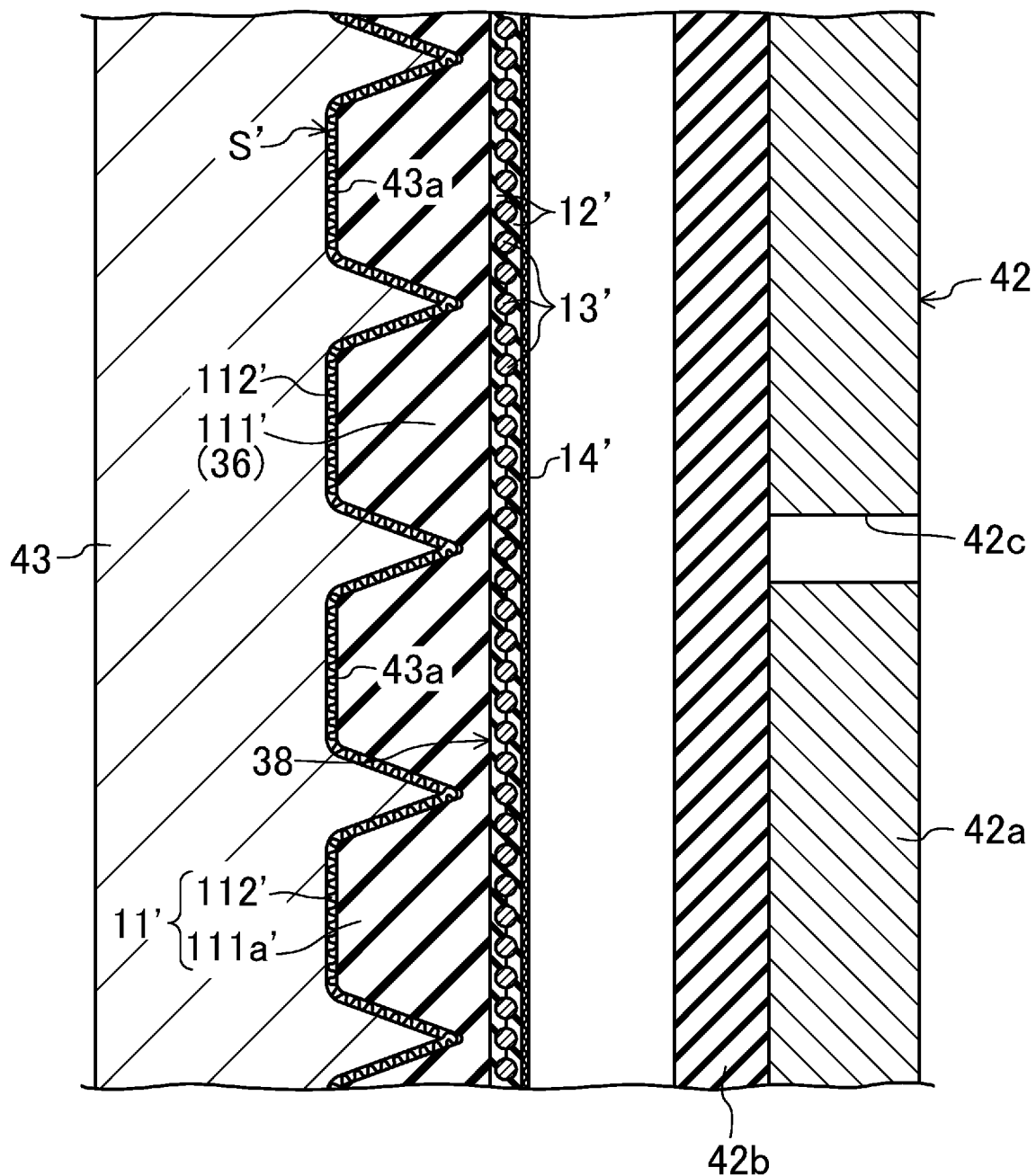
FIG. 6A is a first drawing showing a crosslinking step of the first production method.
Figure 6B:
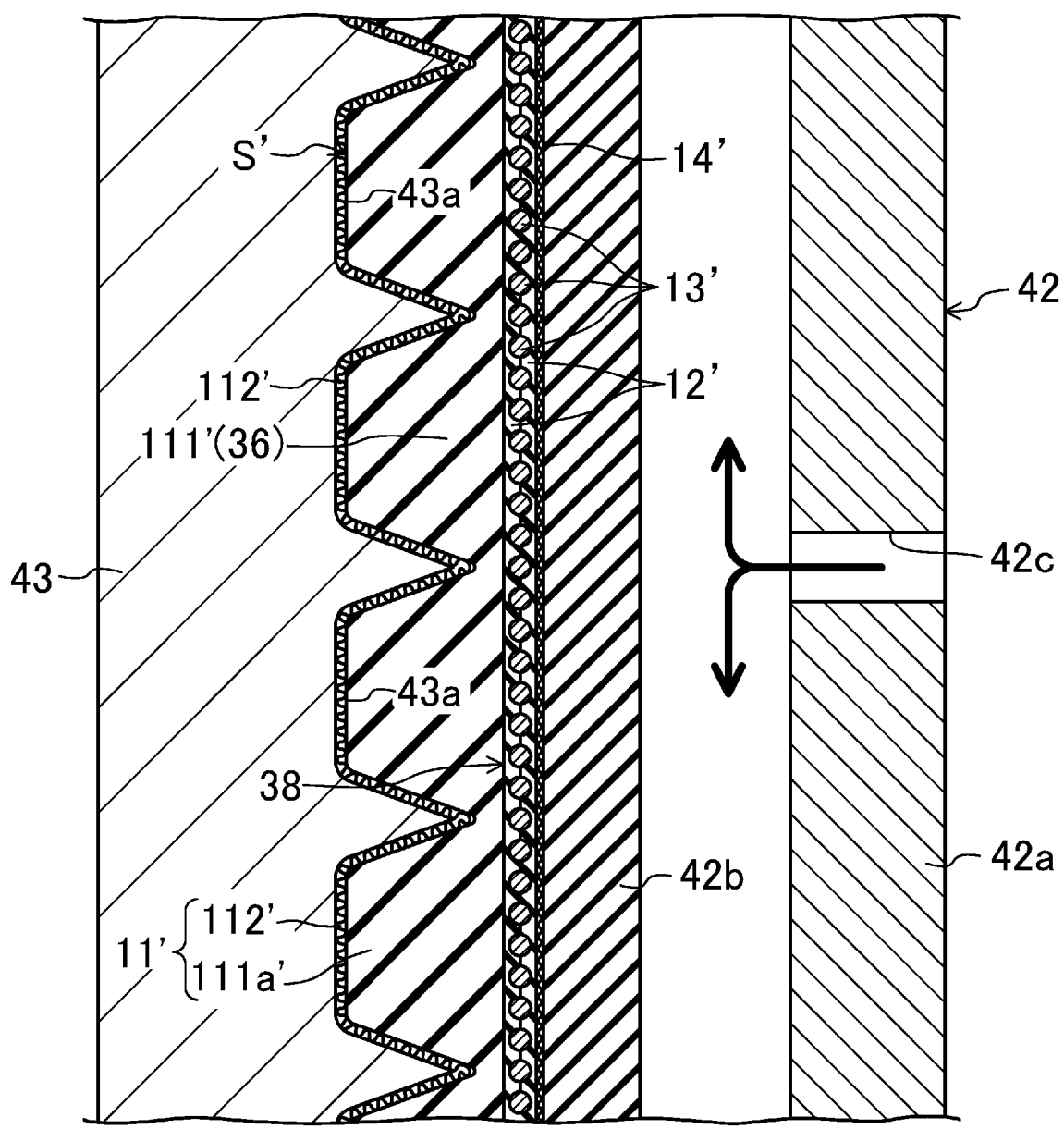
FIG. 6B is a second drawing showing the crosslinking step of the first production method.

As shown in FIG. 6B, the pressurizing means introduces high-pressure air into the drum body 42a of the expansion drum 42 so as to expand the expansion sleeve 42b radially outwardly. After a predetermined pressure is reached, heating is begun. This state is then maintained for a predetermined period of time. At this time, while having each of the compression layer-forming portions 11' fitted in the associated one of the compression layer-shaping grooves 43a of the cylindrical mold 43, the uncrosslinked slab S' is heated by the cylindrical mold 43 and pressed toward the cylindrical mold 43 by the expansion sleeve 42b coming into contact with the uncrosslinked slab S'. That is, the pressing of the shaped structure 36 toward the cylindrical mold 43 is carried out by expanding the expansion sleeve 42b, located radially inward of the shaped structure 36, and pressing the shaped structure 36 from radially inside. The rubber components contained in the core rubber sheet 111' and the adhesive rubber sheets 12' that are included in the uncrosslinked slab S' are crosslinked to be integrated with one another. As a result, a continuous structure of belt bodies 10 each including the core rubber layer 111 and the adhesive rubber layer 12 for a plurality of V-ribbed belts B is produced. At the same time, the rubber components adhere to, and are combined with, the fabric material 112', the cord 13', and the reinforcing fabric 14'. A cylindrical belt slab S is thus molded eventually. For example, the heating is carried out at a temperature of 100° C. to 180° C., the pressurization is carried out at a pressure of 0.5 MPa to 2.0 MPa, and the process continues for 10 minutes to 60 minutes.

Figure 7:
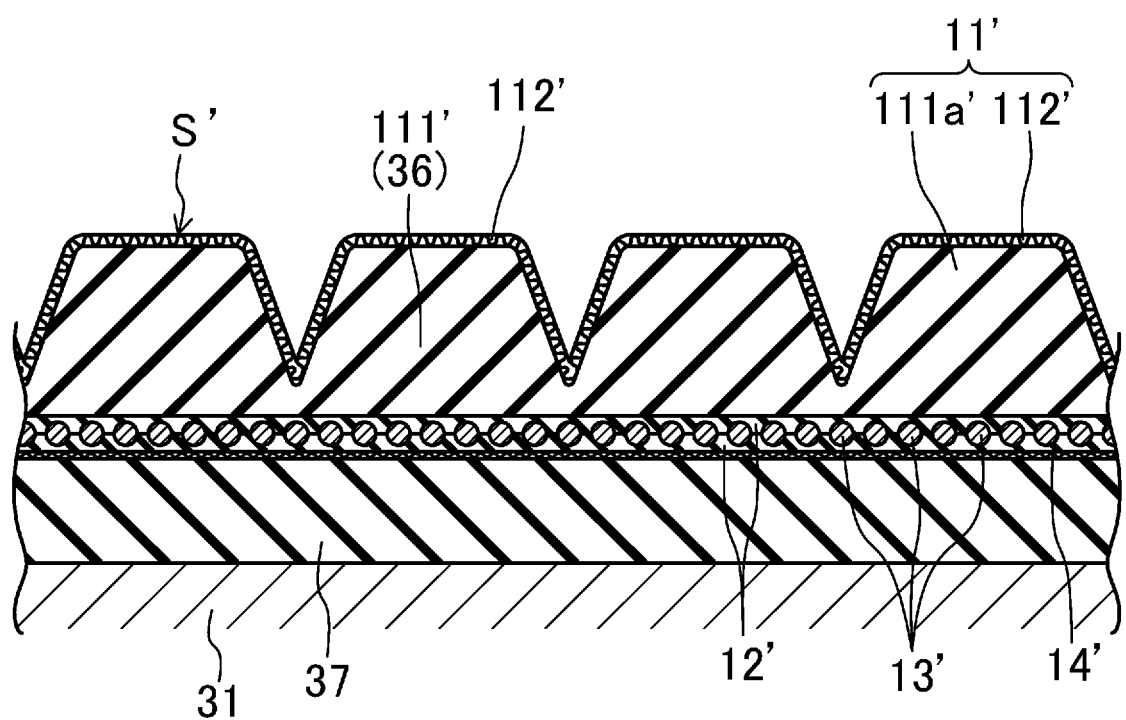
FIG. 7 shows a shaping step of a variation of the first production method.
Figure 8:
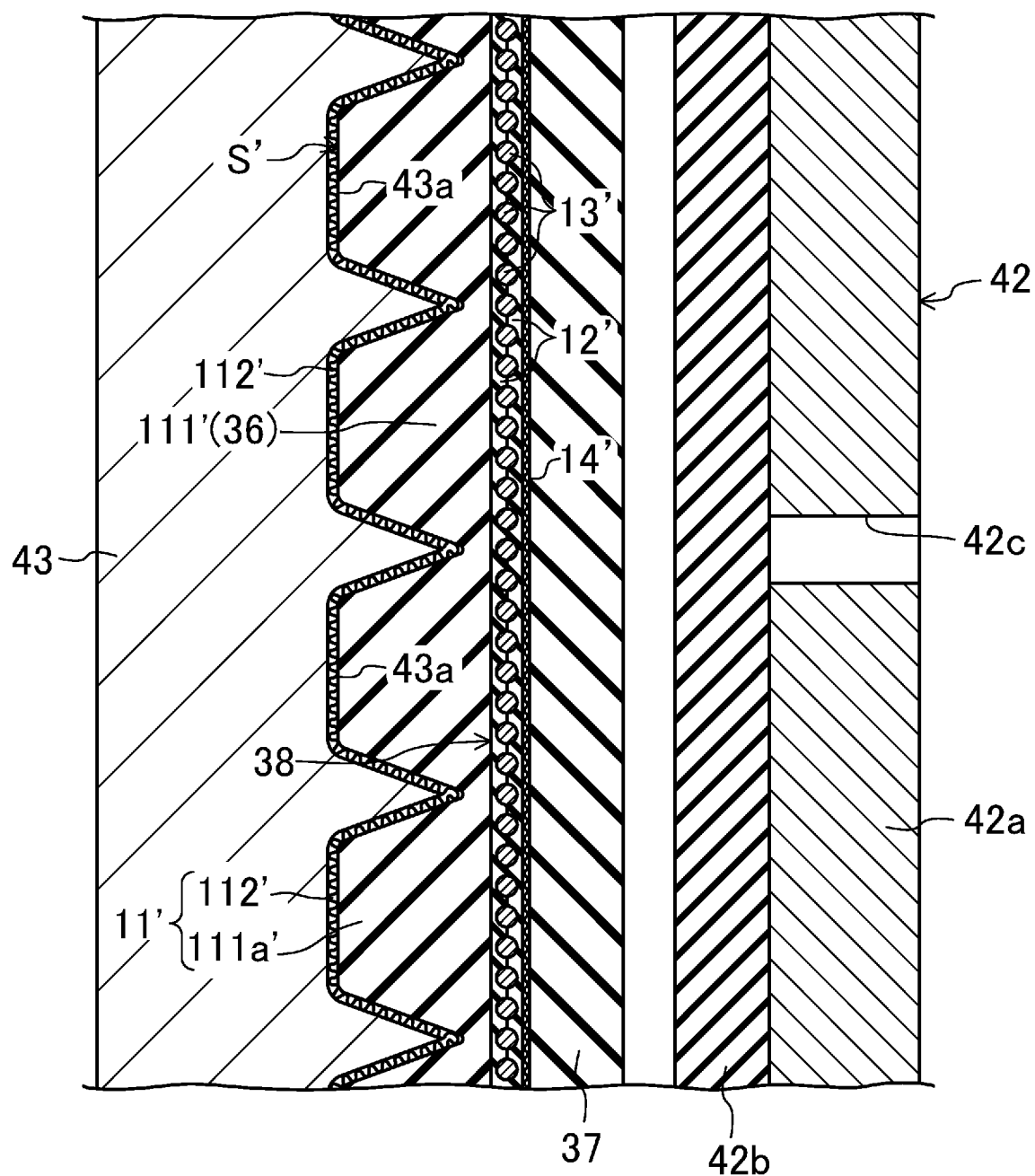
FIG. 8 shows a crosslinking step of a variation of the first production method.

The shaping step may be performed such that, as shown in FIG. 7, a rubber-made shaping sleeve 37 is fitted over the shaping mandrel 31 to form an uncrosslinked slab S' on the shaping sleeve 37. In the crosslinking step, the uncrosslinked slab S' and the shaping sleeve 37 are together removed from the shaping mandrel 31. The removed slab S' and sleeve 37 are then set in the cylindrical mold 43, as shown in FIG. 8. In other words, the shaping sleeve 37 may be interposed between the expansion drum 42 and the uncrosslinked slab S'.

<Finishing Step>

In a finishing step, the pressure inside the drum body 42a applied by the pressurizing means is released. After the cylindrical mold 43 is cooled by the cooling means, the cylindrical mold 43 is detached from the base 41, and the belt slab S that has been molded in the cylindrical mold 43 is removed from the cylindrical mold 43.

Figure 9:
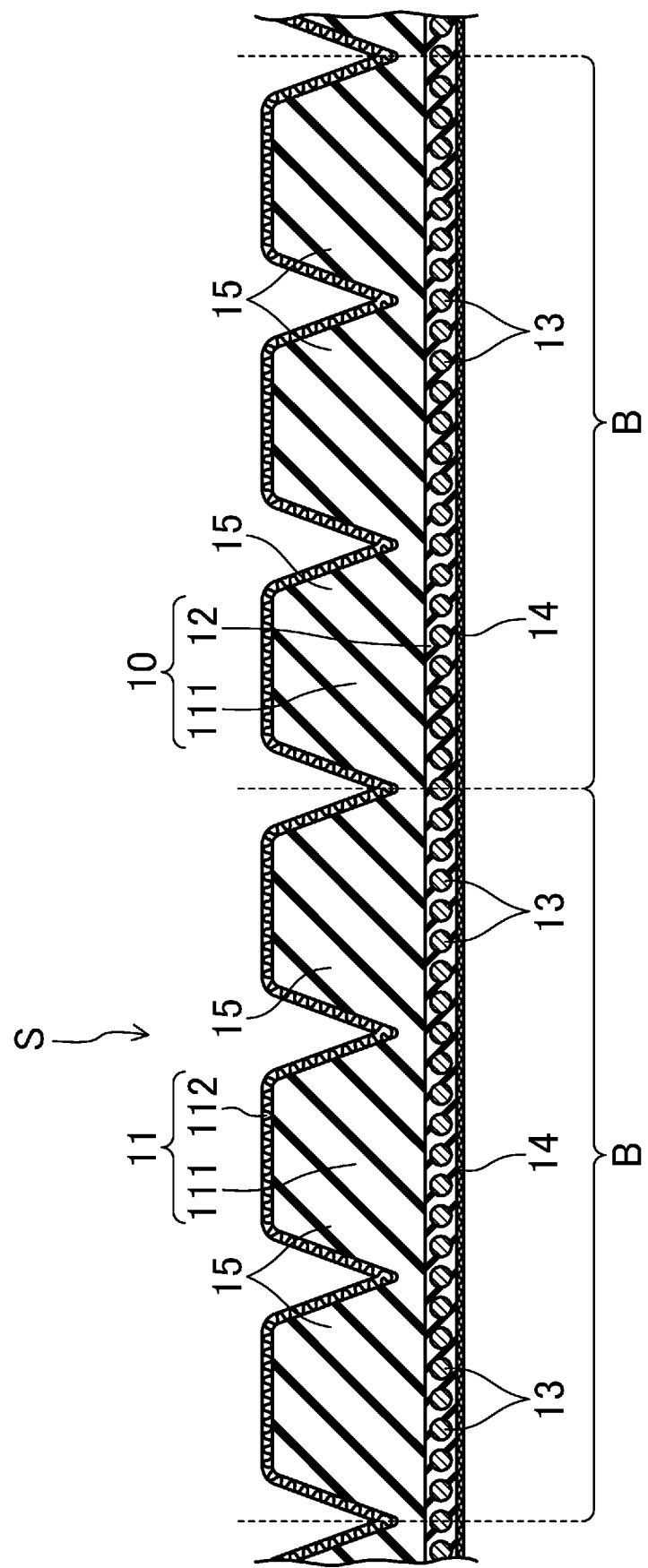
FIG. 9 shows a finishing step of the first production method.

As shown in FIG. 9, the belt slab S that has been removed from the cylindrical mold 43 is cut into ring-shaped pieces each having three compression layer-forming portions 11' in the case of producing V-ribbed belts B each having three V-shaped ribs 15. Each piece is turned inside out, thereby obtaining the V-ribbed belt B of this embodiment.

According to this production method, the shaped structure having a cylindrical shape and including the plurality of core rubber layer-forming portions 111a' that have been formed adjacent to one another in the axial direction in advance so as to constitute the plurality of V-shaped ribs of the compression layer 11, and the fabric material that is to constitute the covering fabric 112 are affixed together to form the belt slab S, and the belt slab S is cut into ring-shaped pieces having two or more of the compression layer-forming portions 11'. Therefore, according to the method of the present disclosure, the ribs are formed in a manner different from the methods of the known art in which an uncrosslinked rubber sheet having canvas layered on a surface thereof is pressed onto a mold having a shape corresponding to multiple ribs and heated, and the tip ends of ribs of the mold push the canvas to locally stretch the canvas. Thus, the method of the present disclosure does not require use of special canvas.

Further, the core rubber layer-forming portions 111a that are made of uncrosslinked rubber and have been formed in advance are covered with the covering fabric 112. Consequently, grooves between the ridges of the core rubber layer-forming portions 111a' stretch the entire covering fabric 112, which can be freely stretched, and then, the covering fabric 112 is affixed to the grooves between the ridges. This substantially prevents the covering fabric 112 from being stretched locally only in the grooves between the ridges, enabling the covering fabric 112 to be affixed while being stretched a little and uniformly. In addition, since the uncrosslinked rubber already has the core rubber layer-forming portions 111a' corresponding to the shapes of ribs, almost no flow occurs in the uncrosslinked rubber when the uncrosslinked rubber is affixed. Thus, the rubber is substantially prevented from seeping through roughed texture of the covering fabric 112 to the surface. Thus, a simply-configured and inexpensive canvas which has a small stretchability can be used as the covering fabric 112.

(Second Production Method)

A second production method will be described below with reference to FIG. 10.

The second production method includes a shaping step in which a core rubber sheet 111' is cut so as to have a length corresponding to the length of a V-ribbed belt B to be produced, and both end faces of the core rubber sheet 111' are cut with ultrasound, a cutter, scissors, or the like, and then butt jointed together such that the core rubber layer-forming portions 111a' face outside and extend in the circumferential direction. To increase the joint strength, the butt joint is suitably achieved by abutting surfaces, of the core rubber sheet 111', which are oblique with respect to the thickness direction of the core rubber sheet 111'. A shaped structure 36 which has a cylindrical shape is produced in this manner. The shaped structure 36 is made of uncrosslinked rubber composition and has, on its outer peripheral surface, the plurality of core rubber layer-forming portions 111a' which are comprised of the ridges extending in the circumferential direction and arranged adjacent to one another in the axial direction.

Next, a fabric material 112' is wrapped around the shaped structure 36 such that the fabric material 112' covers, and is stacked on, the surface of the shaped structure 36. At this time, each of the plurality of the core rubber layer-forming portions 111a' is covered with the fabric material 112'. Thus, compression layer-forming portions 11' are formed. Covering the surface of the core rubber sheet 111' with the fabric material 112' in advance in this manner can substantially prevent the fabric material 112' from being stretched locally and significantly. This can substantially prevent seepage of rubber which may occur through a portion stretched locally and significantly, and consequently, an abnormal noise which may be generated during running of the belt. The fabric material 112' may be closely fitted to the core rubber sheet 111' (the core rubber layer-forming portions 111a') like a single sheet, or may simply lie along the surface of the core rubber sheet 111' instead of being closely fitted. Ends of the fabric material 112' are butt jointed, lap jointed, or jointed, on an underlying layer, with a space between the ends. A fabric material 112' having a predetermined length may be formed into a cylindrical shape through joining of its both ends, and this cylindrical fabric material 112' may be fitted over the shaped structure 36 so as to cover the entire peripheral surface of the shaped structure 36.

Further, in a manner as in FIGS. 4A to 4C illustrating the first production method, a reinforcing fabric 14', an adhesive rubber sheet 12', a cord 13', and another adhesive rubber sheet 12' are stacked on a shaping mandrel 31 in the stated order. After that, the entire peripheral surface of the stacked structure is pressed with a roller 32 on the adhesive rubber sheet 12' to integrate the stacked structure and produce a cylindrical tensile member 38.

Figure 10:
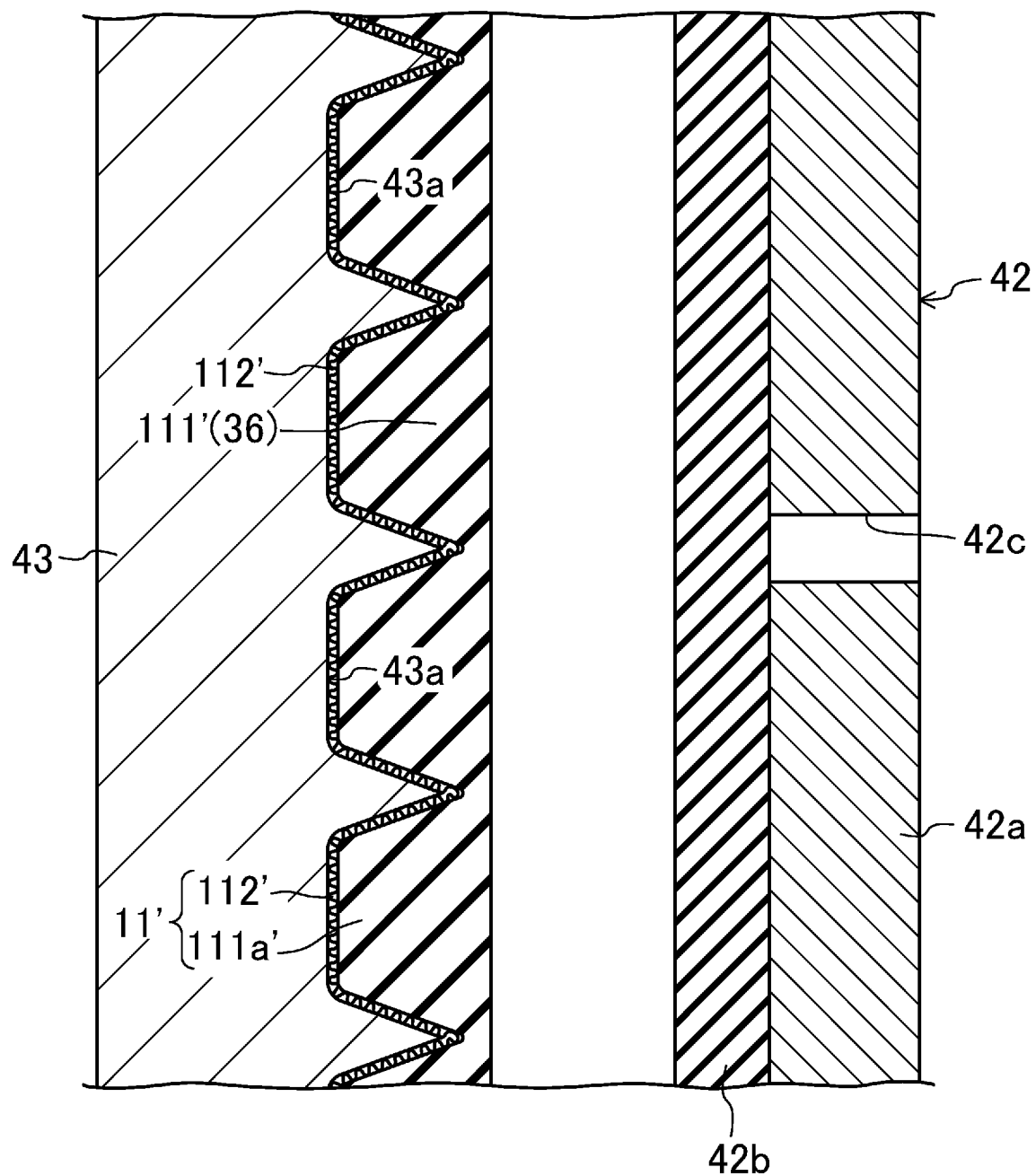
FIG. 10 shows a crosslinking step of a second production method.

In a crosslinking step, the shaped structure 36 covered with the fabric material 112' is set in a cylindrical mold 43, as shown in FIG. 10. More specifically, the shaped structure 36 covered with the fabric material 112' is set in the cylindrical mold 43 such that each of the plurality of compression layer-forming portions 11' comprised of the core rubber layer-forming portions 111a' covered with the fabric material 112' is fitted in an associated one of compression layer-shaping grooves 43a of the cylindrical mold 43. Fitting the compression layer-forming portions 11' in the compression layer-shaping grooves 43a in advance reduces flow in the rubber, thereby enabling the production of the V-ribbed belt B having a stable structure. At this time, the shaped structure 36 and the fabric material 112' are set in the cylindrical mold 43 such that the shaped structure 36 and the fabric material 112' are positioned respectively inside and outside with respect to each other. The cylindrical mold 43 is chosen to correspond to the length of the V-ribbed belt B to be produced. Note that short fibers, resin powder, or the like may be attached to the inner peripheral surface of the cylindrical mold 43 and/or the outer peripheral surface of the fabric material 112' in advance.

The tensile member 38 is removed from the shaping mandrel 31, and is then fitted in the shaped structure 36 set in the cylindrical mold 43, such that the outer peripheral surface of the tensile member 38 comes into contact with the inner peripheral surface of the shaped structure 36, that is, so as to be in a positional relationship as in FIG. 6A illustrating the first production method.

Then, the cylindrical mold 43 within which the shaped structure 36 covered with the fabric material 112' and the tensile member 38 have been set is attached to the base 41 such that the cylindrical mold 43 covers the expansion drum 42. This means that the tensile member 38, which is comprised of an uncrosslinked rubber composition shaped into a cylindrical shape in which the cord 13' is embedded so as to form a helical pattern having pitches in the axial direction, is placed between the shaped structure 36 and the expansion sleeve 42b of the expansion drum 42. Before expansion of the expansion sleeve 42b, a gap is interposed between the tensile member 38 and the expansion sleeve 42b, and the shaped structure 36 and the tensile member 38 are in contact with each other.

Note that the shaped structure 36 covered with the fabric material 112' may be fitted over the tensile member 38 to produce the uncrosslinked slab S'. This uncrosslinked slab S' may be placed in the cylindrical mold 43.

Alternatively, the shaped structure 36 covered with the fabric material 112' may be placed in the cylindrical mold 43, and the tensile member 38 may be placed outside the expansion drum 42. In this case, a gap is interposed between the shaped structure 36 covered with the fabric material 112' and set in the cylindrical mold 43, and the tensile member 38 set over the expansion drum 42. When the expansion sleeve 42b of the expansion drum 42 is expanded radially outward, the tensile member 38 expands radially outward and comes into contact with the shaped structure 36 covered with the fabric material 112'. The tensile member 38 and the shaped structure 36 covered with the fabric material 112' in this state are heated by the cylindrical mold 43, and are pressed toward the cylindrical mold 43 by the expansion sleeve 42b. A belt slab S is molded as a result. That is, the pressing of the shaped structure 36 toward the cylindrical mold 43 is carried out by expanding the expansion sleeve 42b, located radially inward of the shaped structure 36, and pressing the shaped structure 36 from radially inside.

The other features and advantages are the same as those of the first production method.

(Third Production Method)

Figure 11:
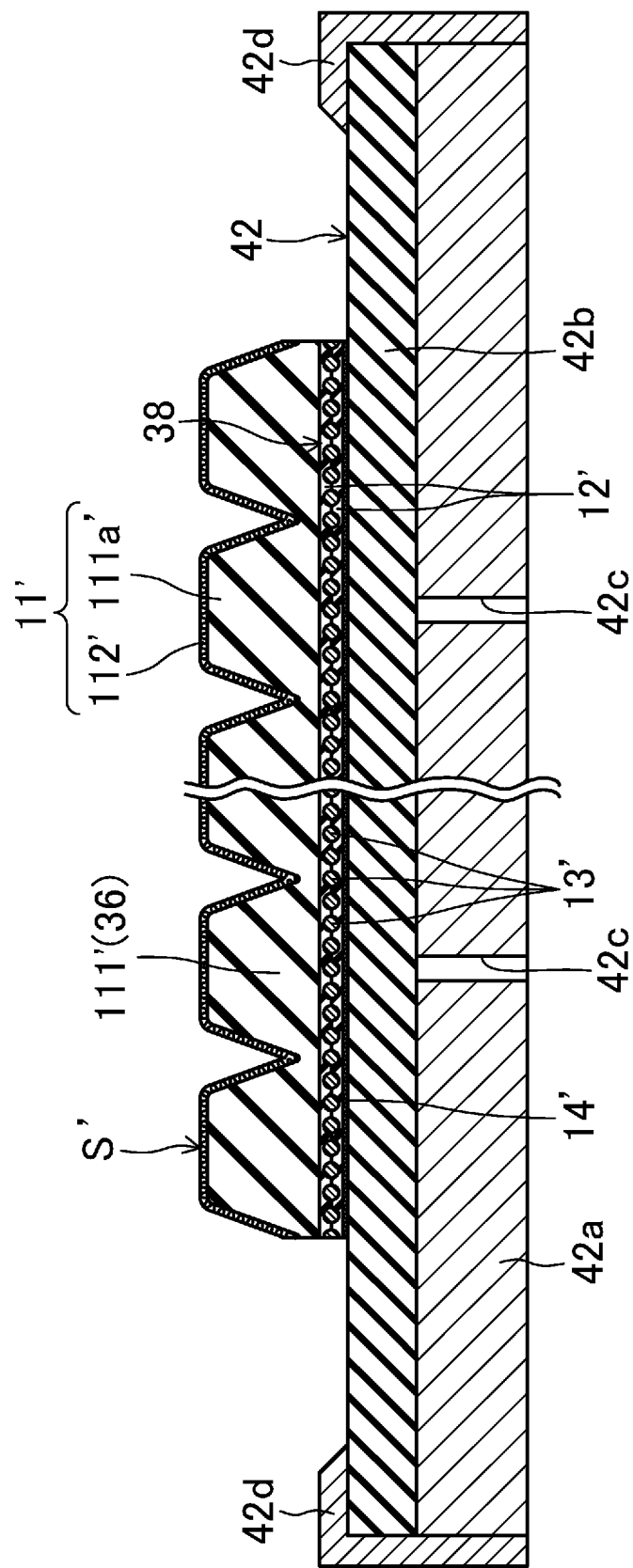
FIG. 11 shows a shaping step of a third production method.

A third production method will be described with reference to FIGS. 11, 12A and 12B.

According to the third production method, a crosslinking apparatus 40 including an expansion drum 42 that is attachable to, and detachable from, a base 41 is used. The expansion drum 42 serves as a shaping mandrel. The expansion drum 42 includes a drum body 42a having a hollow columnar shape, and an expansion sleeve 42b made of rubber and externally fitted over the outer periphery of the drum body 42a. The expansion drum 42 has basically the same structure as that for use in the first production method. Fixing rings 42d fix both ends of the expansion sleeve 42b to the drum body 42a and seal a space between the expansion sleeve 42b and the drum body 42a.

In a shaping step, the expansion drum 42 is rotatably supported on a shaft of a shaping machine (not shown) such that the axis of the expansion drum 42 extends horizontally. As shown in FIG. 11, similarly to the first production method, a reinforcing fabric 14', an adhesive rubber sheet 12', a cord 13', another adhesive rubber sheet 12', a core rubber sheet 111', and a fabric 112' are stacked on the expansion drum 42, thereby forming an uncrosslinked slab S'.

Figure 12A:
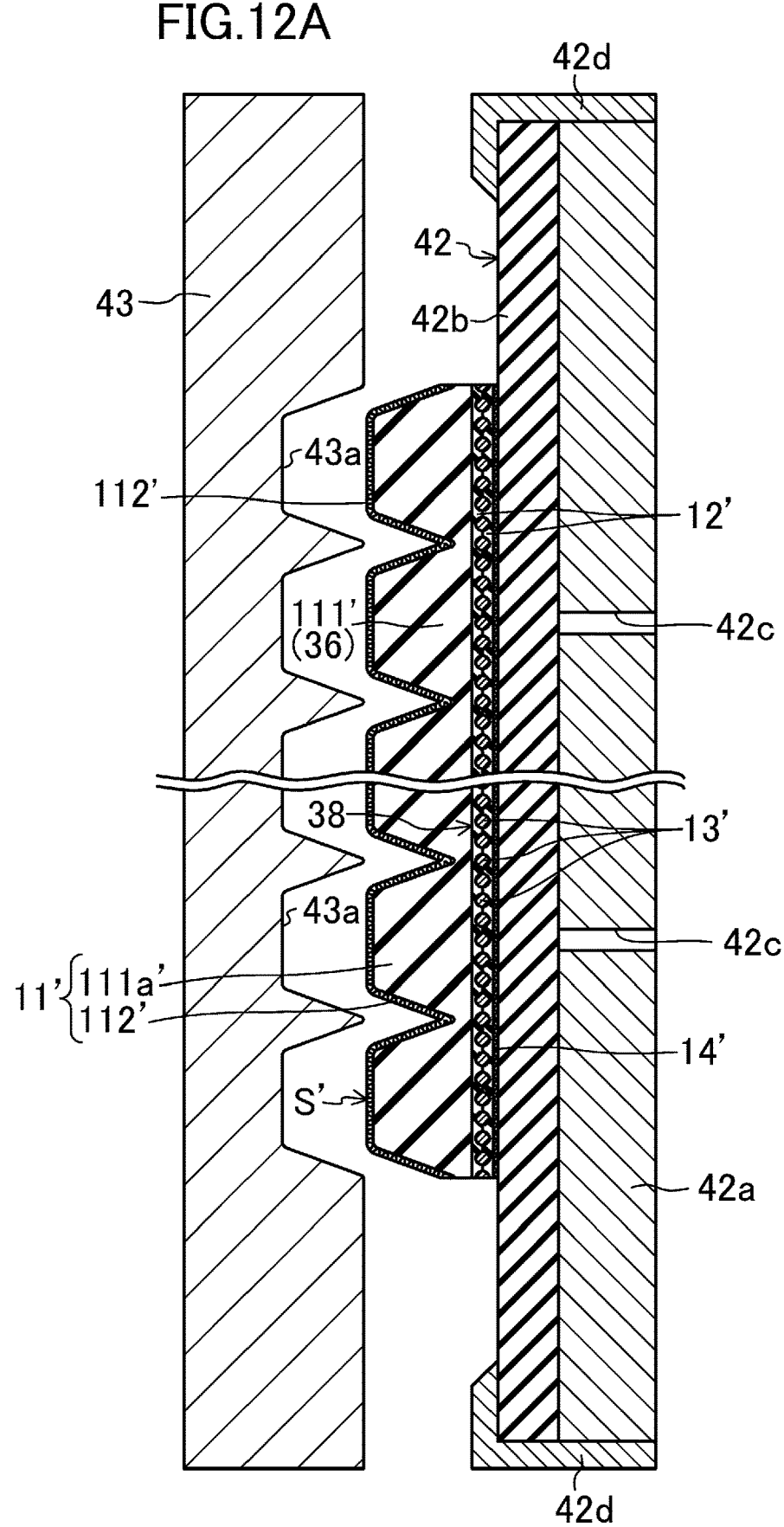
FIG. 12A is a first drawing showing a crosslinking step of the third production method.

In a crosslinking step, as shown FIG. 12A, the expansion drum 42 on which the uncrosslinked slab S' has been formed is detached from the shaping machine, and the expansion drum 42 is attached to the crosslinking apparatus 40 so as to stand on the base 41 of the crosslinking apparatus 40.

Next, the cylindrical mold 43 is attached to the base 41 such that the cylindrical mold 43 covers the expansion drum 42. At this time, the shaped structure 36 comprised of the cylindrically-shaped core rubber sheet 111' and the fabric material 112' that are included in the uncrosslinked slab S' are set in the cylindrical mold 43 such that the shaped structure 36 and the fabric material 112' are positioned respectively inside and outside with respect to each other. The cylindrical mold 43 is chosen to correspond to the length of the V-ribbed belt B to be produced and to have an inner diameter larger than the outer diameter of the uncrosslinked slab S' formed on the expansion drum 42. The uncrosslinked slab S' is disposed such that the distal end of each of the compression layer-forming portions 11' is positioned at the opening of an associated one of the compression layer-shaping grooves 43a of the cylindrical mold 43. This means that the tensile member 38, which is comprised of an uncrosslinked rubber composition shaped into a cylindrical shape in which the cord 13' is embedded so as to form a helical pattern having pitches in the axial direction, is placed between the shaped structure 36 and the expansion sleeve 42b of the expansion drum 42. Before expansion of the expansion sleeve 42b, the tensile member 38 is formed on the expansion sleeve 42b, and the shaped structure 36 and the tensile member 38 are in contact with each other. Note that short fibers, resin powder, or the like may be attached to the inner peripheral surface of the cylindrical mold 43 and/or the outer peripheral surface of the uncrosslinked slab S' in advance.

Figure 12B:
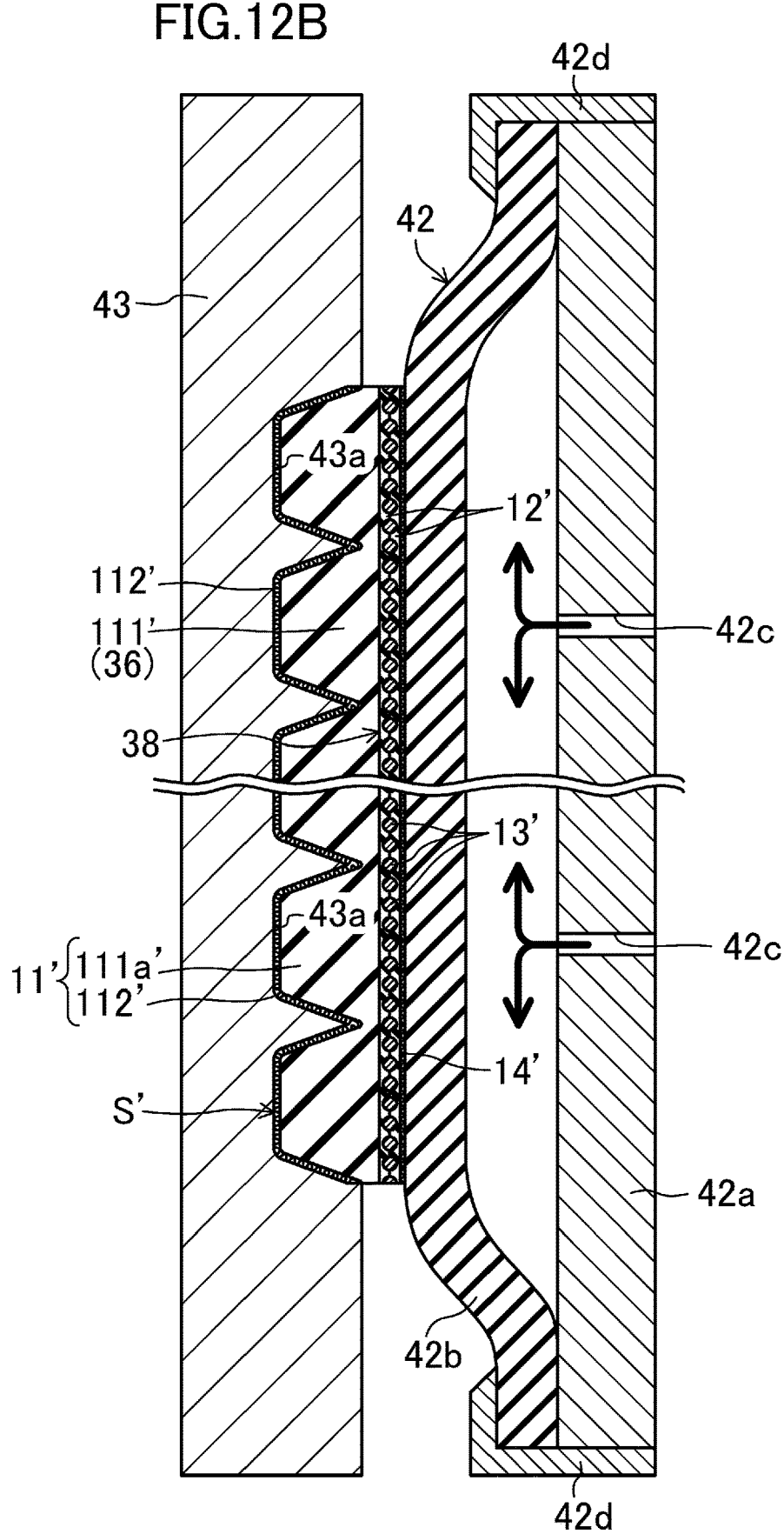
FIG. 12B is a second drawing showing the crosslinking step of the third production method.

As shown in FIG. 12B, a pressurizing means introduces high-pressure air into the drum body 42a of the expansion drum 42 so as to expand the expansion sleeve 42b radially outward. After a predetermined pressure is reached, heating is begun. This state is then maintained for a predetermined period of time. At this moment, the uncrosslinked slab S' is pressed by the expansion sleeve 42b and expands radially outward, causing each of the compression layer-forming portions 11' enters the associated one of the compression layer-shaping grooves 43a of the cylindrical mold 43 to be fitted therein. In this state, the uncrosslinked slab S' is heated by the cylindrical mold 43 and pressed toward the cylindrical mold 43 by the expansion sleeve 42b, thereby molding a belt slab S. That is, the pressing of the shaped structure 36 toward the cylindrical mold 43 is carried out by expanding the expansion sleeve 42b, located radially inward of the shaped structure 36, and pressing the shaped structure 36 from radially inside.

The other features and advantages are the same as those of the first production method.

(Fourth Production Method)

A fourth production method will be described below with reference to FIG. 13.

The fourth production method includes a shaping step in which a shaped structure 36 which has a cylindrical shape and is covered with a fabric material 112' is formed, similarly to the second production method. Similarly to the third production method, a crosslinking apparatus 40 including an expansion drum 42 that is attachable to, and detachable from, a base 41 is used. An expansion drum 42 is rotatably supported on a shaft of a shaping machine (not shown) such that the axis of the expansion drum 42 extends horizontally. Similarly to the second production method (see FIGS. 4A to 4C illustrating the first production method), a tensile member 38 is formed on the expansion drum 42.

Figure 13:
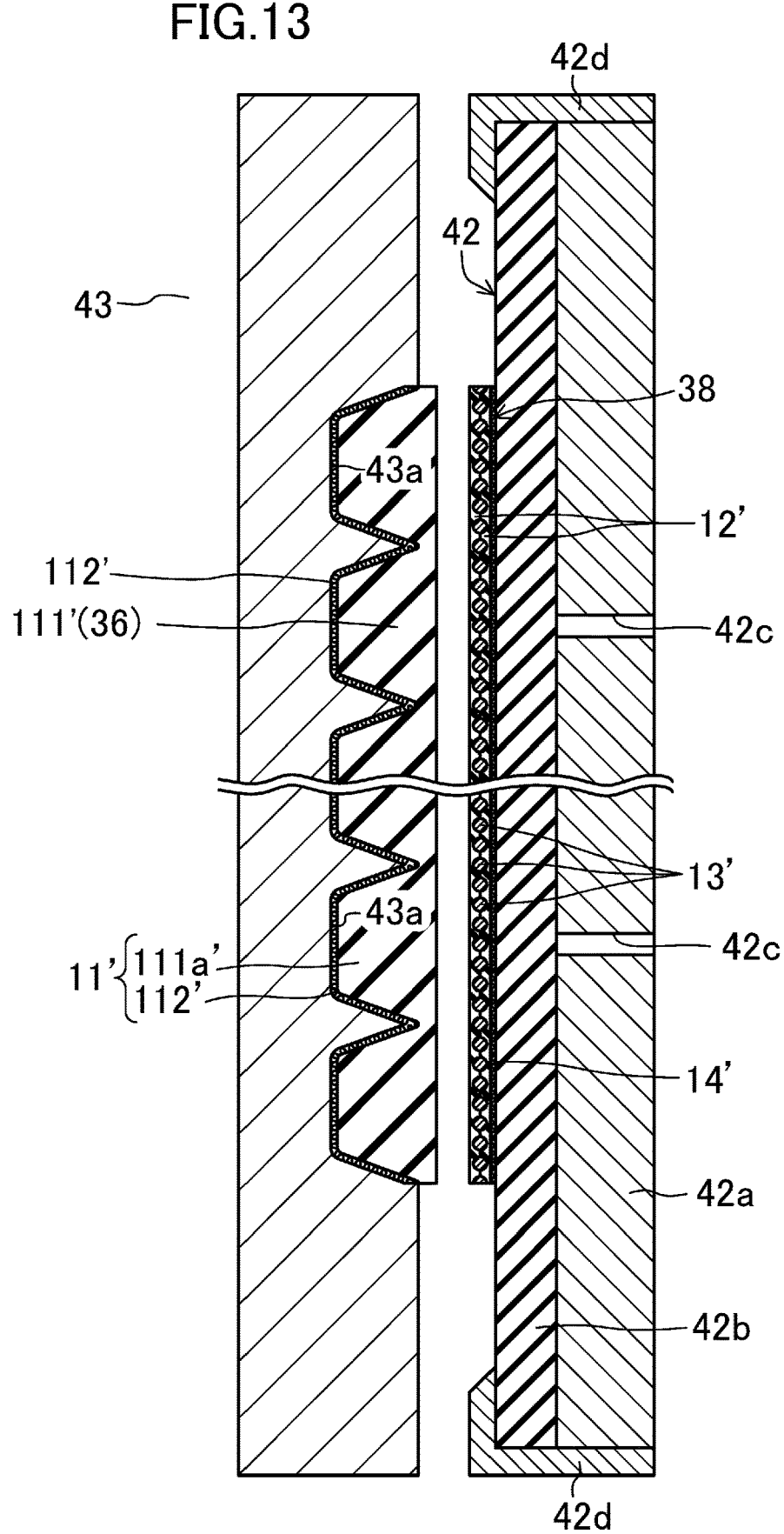
FIG. 13 shows a crosslinking step of a fourth production method.

Similarly to the second production method, in a crosslinking step, the shaped structure 36 covered with the fabric material 112' is placed in the cylindrical mold 43, as shown in FIG. 13. More specifically, the shaped structure 36 covered with the fabric material 112' is set in the cylindrical mold 43 such that each of the plurality of compression layer-forming portions 11' comprised of the core rubber layer-forming portions 111a' covered with the fabric material 112' is fitted in an associated one of compression layer-shaping grooves 43a of the cylindrical mold 43. Fitting the compression layer-forming portions 11' in the compression layer-shaping grooves 43a in advance reduces flow in the rubber, thereby enabling the production of the V-ribbed belt B having a stable structure. At this time, the shaped structure 36 and the fabric material 112' are set in the cylindrical mold 43 such that the shaped structure 36 and the fabric material 112' are positioned respectively inside and outside with respect to each other. The cylindrical mold 43 is chosen to correspond to the length of the V-ribbed belt B to be produced. Note that short fibers, resin powder, or the like may be attached to the inner peripheral surface of the cylindrical mold 43 and/or the outer peripheral surface of the fabric material 112' in advance.

The expansion drum 42 on which the tensile member 38 has been formed is detached from the shaping machine, and the expansion drum 42 is attached to the crosslinking apparatus 40 so as to stand on the base 41 of the crosslinking apparatus 40. Then, the cylindrical mold 43 within which the shaped structure 36 covered with the fabric material 112' has been set is attached to the base 41 such that the cylindrical mold 43 covers the expansion drum 42. This means that the tensile member 38, which is comprised of an uncrosslinked rubber composition shaped into a cylindrical shape in which the cord 13' is embedded so as to form a helical pattern having pitches in the axial direction, is placed between the shaped structure 36 and the expansion sleeve 42b of the expansion drum 42. Before expansion of the expansion sleeve 42b, a gap is interposed between the shaped structure 36 and the tensile member 38, and the tensile member 38 is formed on the expansion sleeve 42b.

A pressurizing means then introduces high-pressure air into the drum body 42a of the expansion drum 42 so as to expand the expansion sleeve 42b radially outwardly. After a predetermined pressure is reached, heating is begun. This state is then maintained for a predetermined period of time. At this moment, the tensile member 38 is pressed by the expansion sleeve 42b and expands radially outward to come into contact with the shaped structure 36. While each of the compression layer-forming portions 11' is fitted in an associated one of the compression layer-shaping grooves 43a of the cylindrical mold 43, the tensile member 38 and the shaped structure 36 covered with the fabric material 112' are heated by the cylindrical mold 43 and pressed towards the cylindrical mold 43 by the expansion sleeve 42b, thereby molding a belt slab S. That is, the pressing of the shaped structure 36 toward the cylindrical mold 43 is carried out by expanding the expansion sleeve 42b, located radially inward of the shaped structure 36, and pressing the shaped structure 36 from radially inside.

The other features and advantages are the same as those of the second production method.

(Fifth Production Method)

A fifth production method will be described below with reference to FIGS. 14A to 14C.

The fifth production method includes a shaping step in which a core rubber sheet 111' is covered with a fabric material 112' in advance, and core rubber layer-forming portions 111a' covered with the fabric material 112' constitute compression layer-forming portions 11'. Covering the surface of the core rubber sheet 111' with the fabric material 112' in advance in this manner can substantially prevent the fabric material 112' from being stretched locally and significantly. This can substantially prevent seepage of rubber which may occur through a portion stretched locally and significantly, and consequently, an abnormal noise which may be generated during running of the belt. The fabric material 112' may be closely fitted to the core rubber sheet 111' (the core rubber layer-forming portions 111a') like a single sheet, or may simply lie along the surface of the core rubber sheet 111' instead of being closely fitted.

Figure 14A:
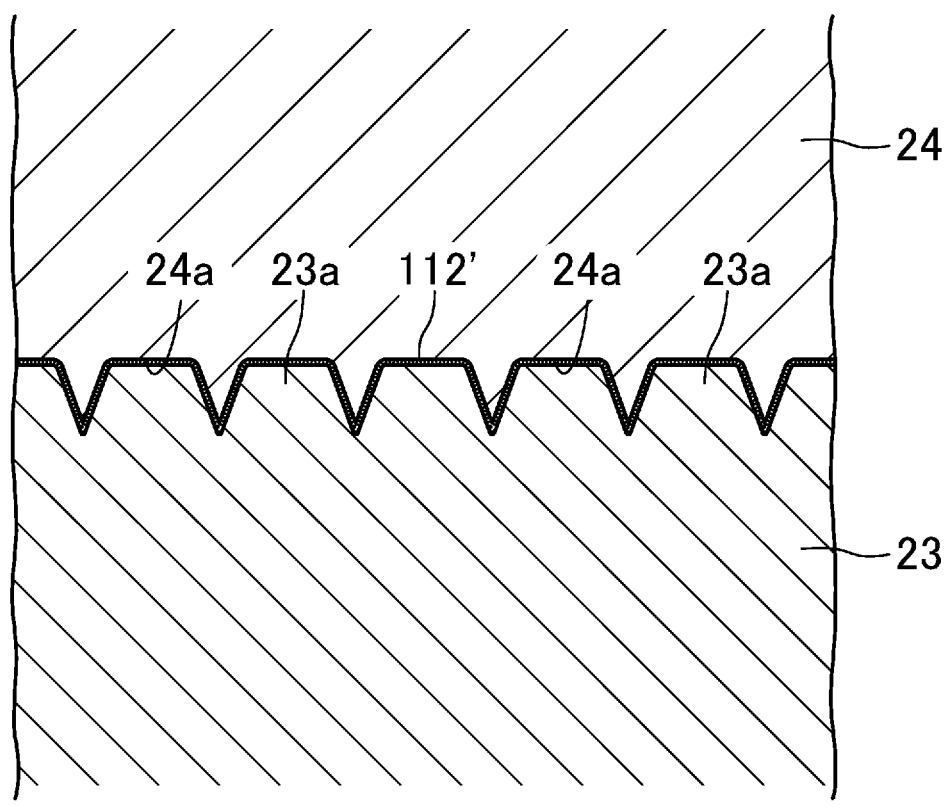
FIG. 14A is a first drawing showing how to affix a fabric material to a core rubber sheet in a component preparation step of a fifth production method.
Figure 14B:
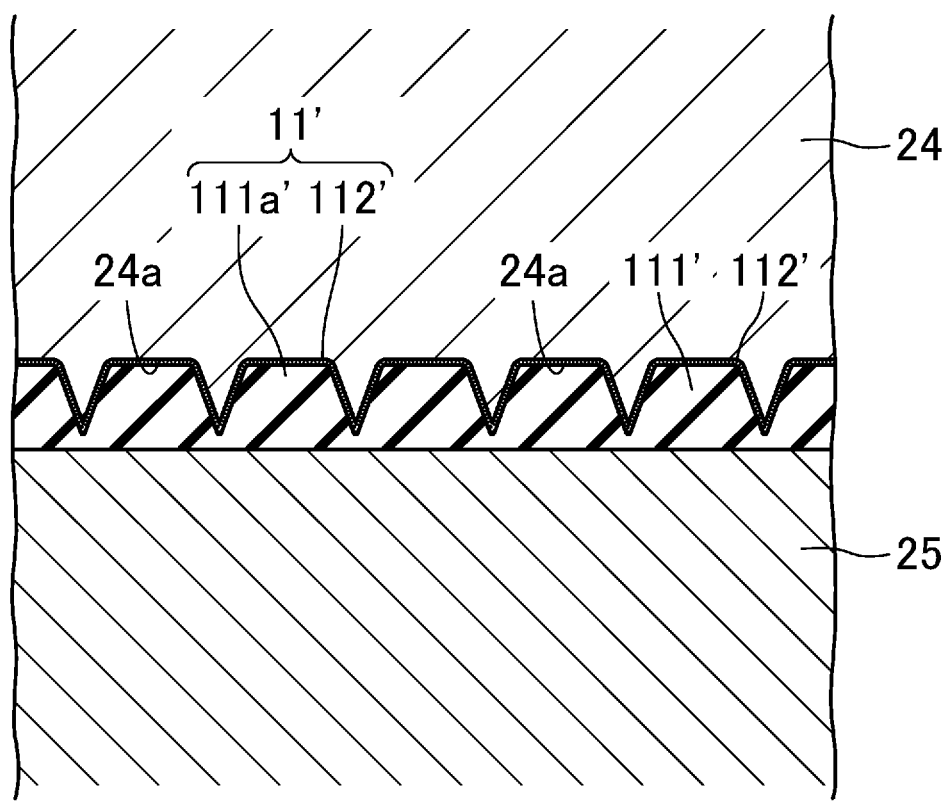
FIG. 14B is a second drawing showing how to affix the fabric material to the core rubber sheet in the component preparation step of the fifth production method.
Figure 14C:
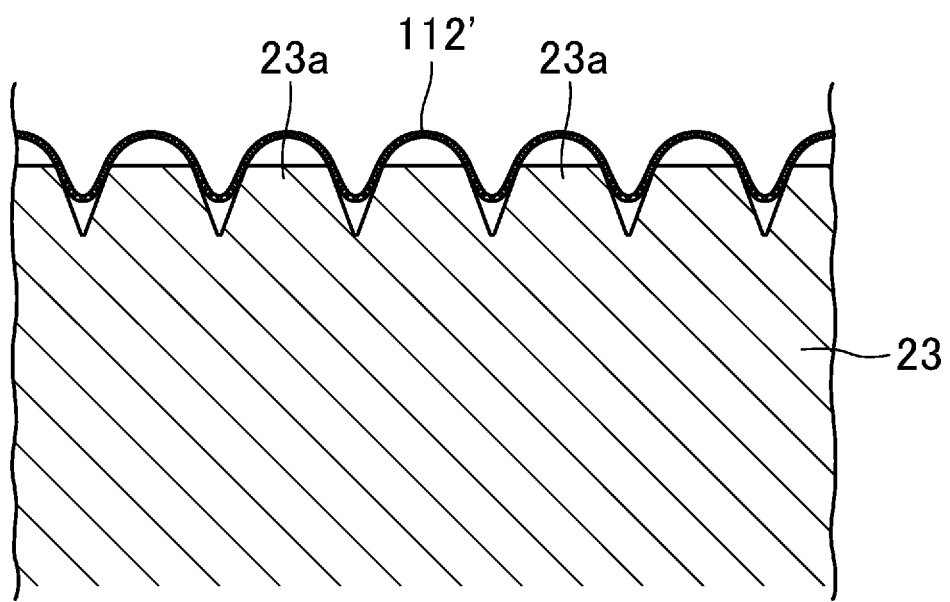
FIG. 14C is a third drawing showing how to affix the fabric material to the core rubber sheet in the component preparation step of the fifth production method.

FIG. 14A illustrates how the fabric material 112' is caused to cover the core rubber sheet 111'. A fabric material-shaping roll 23 has trapezoidal ridges 23a which correspond to the shape of the core rubber layer-forming portions 111a', extend in a circumferential direction, and are arranged adjacent to one another in the axial direction of the fabric material-shaping roll 23. A transfer roll 24 has trapezoidal grooves 24a which correspond to the shape of the core rubber layer-forming portions 111a', extend in a circumferential direction, and are arranged adjacent to one another in the axial direction of the transfer roll 24. The fabric material-shaping roll 23 and the transfer roll 24 are caused to mesh with each other with a gap interposed therebetween, and the fabric material 112' is passed between the rolls such the fabric material 112' is shaped to fit the surface of the transfer roll 24 by the fabric material-shaping roll 23. Subsequently, as shown in FIG. 14B, the core rubber sheet 111' is passed between the transfer roll 24 and a flat roll 25 such that the core rubber layer-forming portions 111a' are fitted in the trapezoidal grooves 24a of the transfer roll 24, thereby affixing the fabric material 112' to a surface of the core rubber sheet 111'. In order to enhance the productivity, it is preferable to produce the core rubber sheet 111' covered with the fabric material 112' from an uncrosslinked rubber sheet 111" in a continuous manner, as follows: the uncrosslinked rubber sheet 111" is shaped into the core rubber sheet 111' using a core rubber-shaping roll 21 as shown in FIGS. 3A and 3B; the fabric material 112' is shaped to fit the transfer roll 24 using the fabric material-shaping roll 23 and the transfer roll 24 as shown in FIG. 14A; and the shaped fabric material 112' is affixed to the core rubber sheet 111' as shown in FIG. 14B.

Thus, covering, in advance, a surface of the core rubber sheet 111' (the core rubber layer-forming portions 111a') with the fabric material 112', which has been shaped to fit the surface of the core rubber layer-forming portions 111a' prior to the covering, makes it possible to reduce local stretch of the fabric material 112' to a small amount, enabling production of a V-shaped ribbed belt B in which seepage of rubber through the covering fabric 112 is reduced. In order to reduce local stretch of the fabric material 112' to a small amount, it is also preferable that: similarly to the first production method, the fabric material 112' is subjected to a pleating process so that the cross section in the width direction is corrugated to have the same pitches as those of the core rubber layer-forming portions 111a', before passing over the fabric material-shaping roll 23 followed by the covering of the surface of the core rubber sheet 111' (the core rubber layer-forming portions 111a'); as shown in FIG. 14C, the pleated fabric material 112' is then set such that its portions protruding toward the core rubber sheet 111' (the core rubber layer-forming portions 111a') are positioned at the grooves between the trapezoidal ridges 23a of the fabric material-shaping roll 23, i.e., the grooves between the core rubber layer-forming portions 111a' of the core rubber sheet 111'; and the protruding portions are halfway fitted in the grooves so that the fabric material 112' loosely fits the core rubber sheet 111'.

The core rubber sheet 111' can be covered with the fabric material 112' by pressing.

In the first and third production methods, the resultant core rubber sheet 111' covered with the fabric material 112' may be wrapped around the adhesive rubber sheet 12' to prepare the uncrosslinked slab S'. In the second and fourth production methods, the resultant core rubber sheet 111' covered with the fabric material 112' may be used for producing the shaped structure 36 covered with the fabric material 112'.

The other features and advantages are the same as those of the first, second, third, or fourth production method.

(Sixth Production Method)

A sixth production method will be described below with reference to FIGS. 15A and 15B and FIGS. 16A and 16B.

The sixth production method includes a shaping step in which, in a manner as in FIGS. 4A to 4C illustrating the first production method, a reinforcing fabric 14', an adhesive rubber sheet 12', a cord 13', and another adhesive rubber sheet 12' are stacked on a shaping mandrel 31 in the stated order. After that, the entire peripheral surface of the stacked structure is pressed with a roller 32 on the adhesive rubber sheet 12' to integrate the stacked structure to form a tensile member 38, around which the core rubber sheet 111' is wrapped.

Figure 15A:
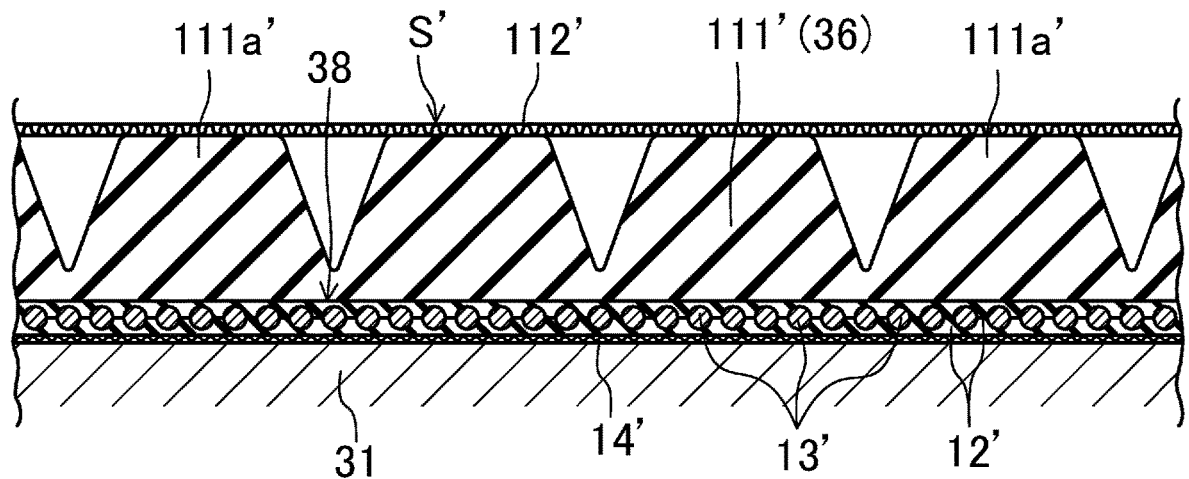
FIG. 15A shows a shaping step of a sixth production method.
Figure 15B:
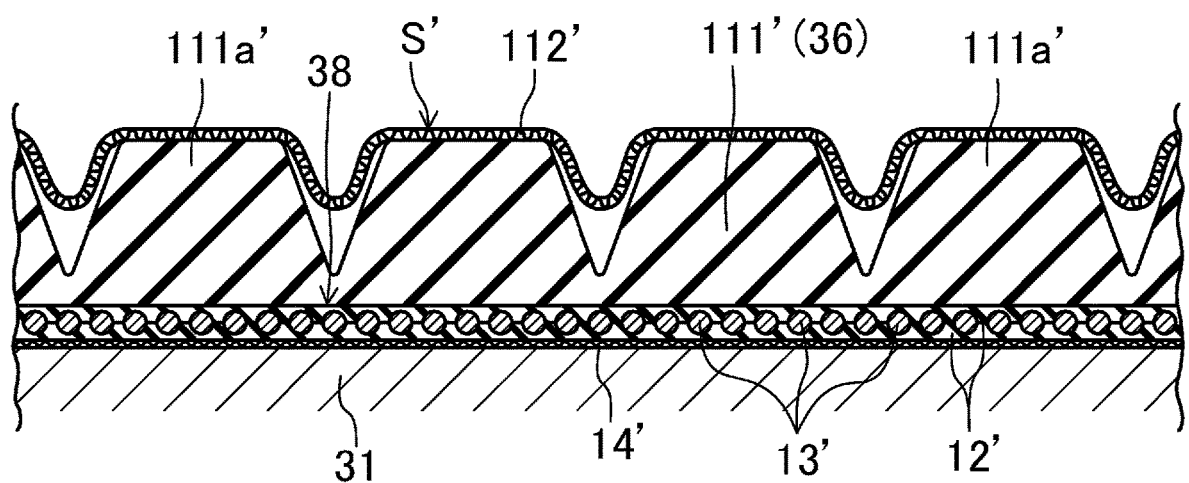
FIG. 15B shows a shaping step of a variation of the sixth production method.

Then, as shown in FIG. 15A, the fabric material 112' is wrapped around the core rubber sheet 111'. At this moment, the fabric material 112' is wrapped to have a cylindrical shape, while being supported on the tops of the core rubber layer-forming portions 111a' of the core rubber sheet 111', and layered on the core rubber sheet 111'. The fabric material 112' is cut with ultrasound, a cutter, scissors, or the like, and its ends are lap jointed together. For the purpose of reducing local stretch of the fabric material 112' to a small amount, portions of the fabric material 112' that correspond to grooves between the core rubber layer-forming portions 111a' of the core rubber sheet 111' may be pressed into the grooves between the core rubber layer-forming portions 111a', as shown in FIG. 15B. For the same purpose, in a manner as in FIG. 4F illustrating the first production method, the fabric material 112' may be subjected to a pleating process so that its cross section in the width direction is corrugated to have the same pitches as those of the core rubber layer-forming portions 111a', and portions of the fabric material 112' that protrude toward the core rubber sheet 111' are halfway fitted in the grooves between the core rubber layer-forming portions 111a' of the core rubber sheet 111' so that the fabric material 112' loosely fits the core rubber sheet 111'. Alternatively, a fabric material 112' having a predetermined length may be formed into a cylindrical shape with its both ends joined together, and this cylindrically-shaped fabric material 112' may be fitted over the core rubber sheet 111'. In this case, fitting the cylindrically-shaped fabric material 112' over the core rubber sheet 111' takes place on the shaping mandrel 31. Alternatively, the cylindrically-shaped fabric material 112' is fitted over the core rubber sheet 111' after the cylindrical structure including the core rubber sheet 111' is removed from the shaping mandrel 31.

In the manner described above, an uncrosslinked slab S' having a cylindrical shape is formed on the shaping mandrel 31. Thus, the uncrosslinked slab S' includes the reinforcing fabric 14', the adhesive rubber sheet 12', the cord 13', the other adhesive rubber sheet 12', the core rubber sheet 111', and the fabric material 112' that are sequentially stacked toward the outside. The uncrosslinked slab S' includes the core rubber sheet 111' formed into a cylindrical shape, i.e., a shaped structure 36 which has a cylindrical shape. The shaped structure 36 is made of the uncrosslinked rubber composition and has, on its outer peripheral surface, the core rubber layer-forming portions 111a' that are comprised of the plurality of ridges extending in the circumferential direction and that are arranged adjacent to one another in the axial direction.

Figure 16A:
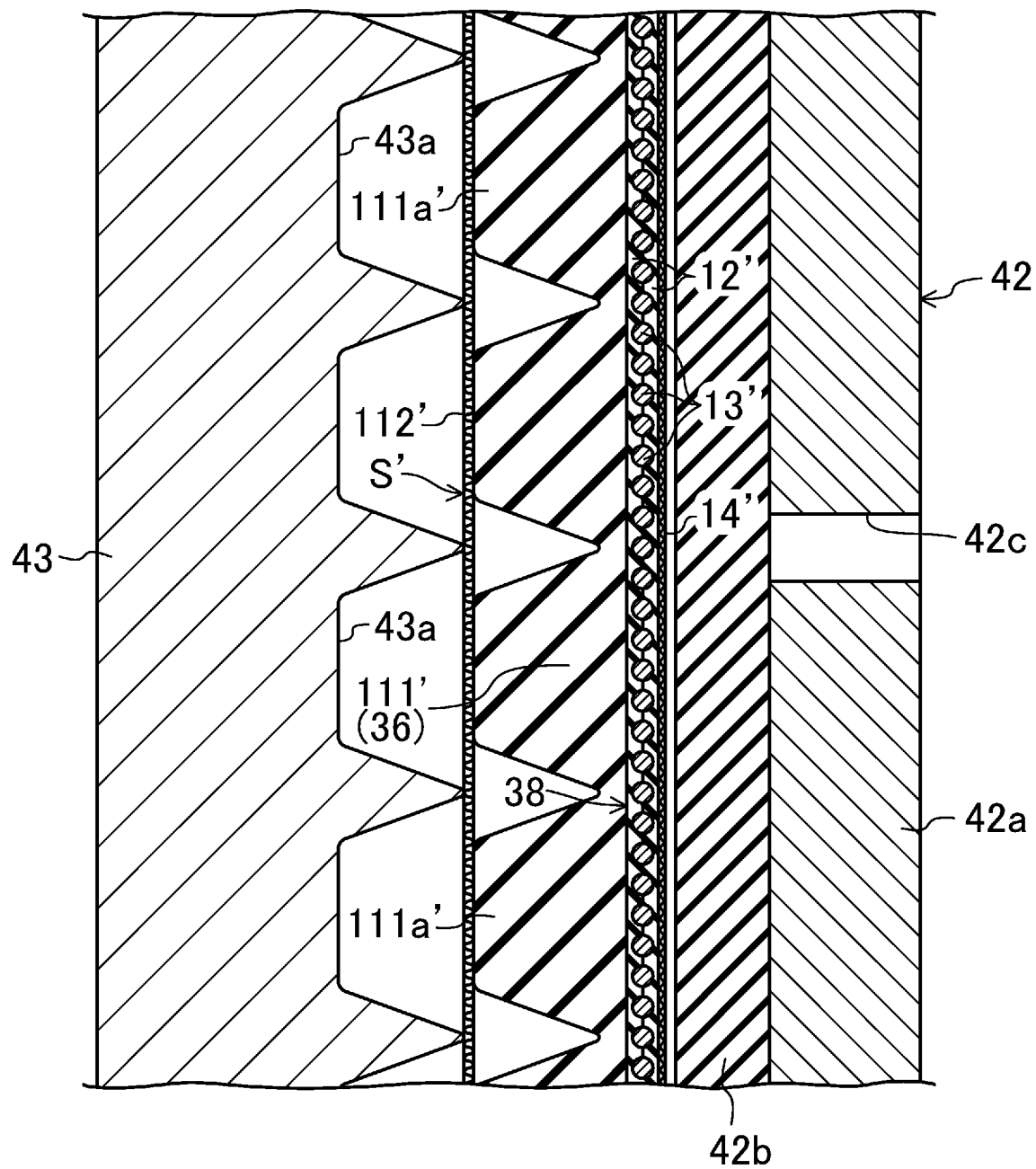
FIG. 16A is a first drawing showing a crosslinking step of the sixth production method.

As shown in FIG. 16A, in a crosslinking step, the uncrosslinked slab S' is removed from the shaping mandrel 31, and then, placed in the cylindrical mold 43 of the crosslinking apparatus 40, which has been previously detached from the base 41. More specifically, the uncrosslinked slab S' is set in the cylindrical mold 43 such that the outer peripheral surface of the fabric material 112' comes into contact with the cylindrical mold 43 at locations apart from each other, and that each of the plurality of core rubber layer-forming portions 111a' of the core rubber sheet 111' is positioned at the opening of an associated one of the compression layer-shaping grooves 43a of the cylindrical mold 43. At this time, the shaped structure 36 and the fabric material 112' are set in the cylindrical mold 43 such that the shaped structure 36 and the fabric material 112' are positioned respectively inside and outside with respect to each other. The core rubber layer-forming portions 111a' may press the fabric material 112' such that a portion of each core rubber layer-forming portion 111a' enters the associated one of the compression layer-shaping grooves 43a. This means that the tensile member 38, which is comprised of an uncrosslinked rubber composition shaped into a cylindrical shape in which the cord 13' is embedded so as to form a helical pattern having pitches in the axial direction, is placed between the shaped structure 36 and the expansion sleeve 42b of the expansion drum 42. Before expansion of the expansion sleeve 42b, a gap is interposed between the tensile member 38 and the expansion sleeve 42b, and the shaped structure 36 and the tensile member 38 are in contact with each other. The cylindrical mold 43 is chosen to correspond to the length of the V-ribbed belt B to be produced. Note that short fibers, resin powder, or the like may be attached to the inner peripheral surface of the cylindrical mold 43 and/or the outer peripheral surface of the uncrosslinked slab S' in advance.

Figure 16B:
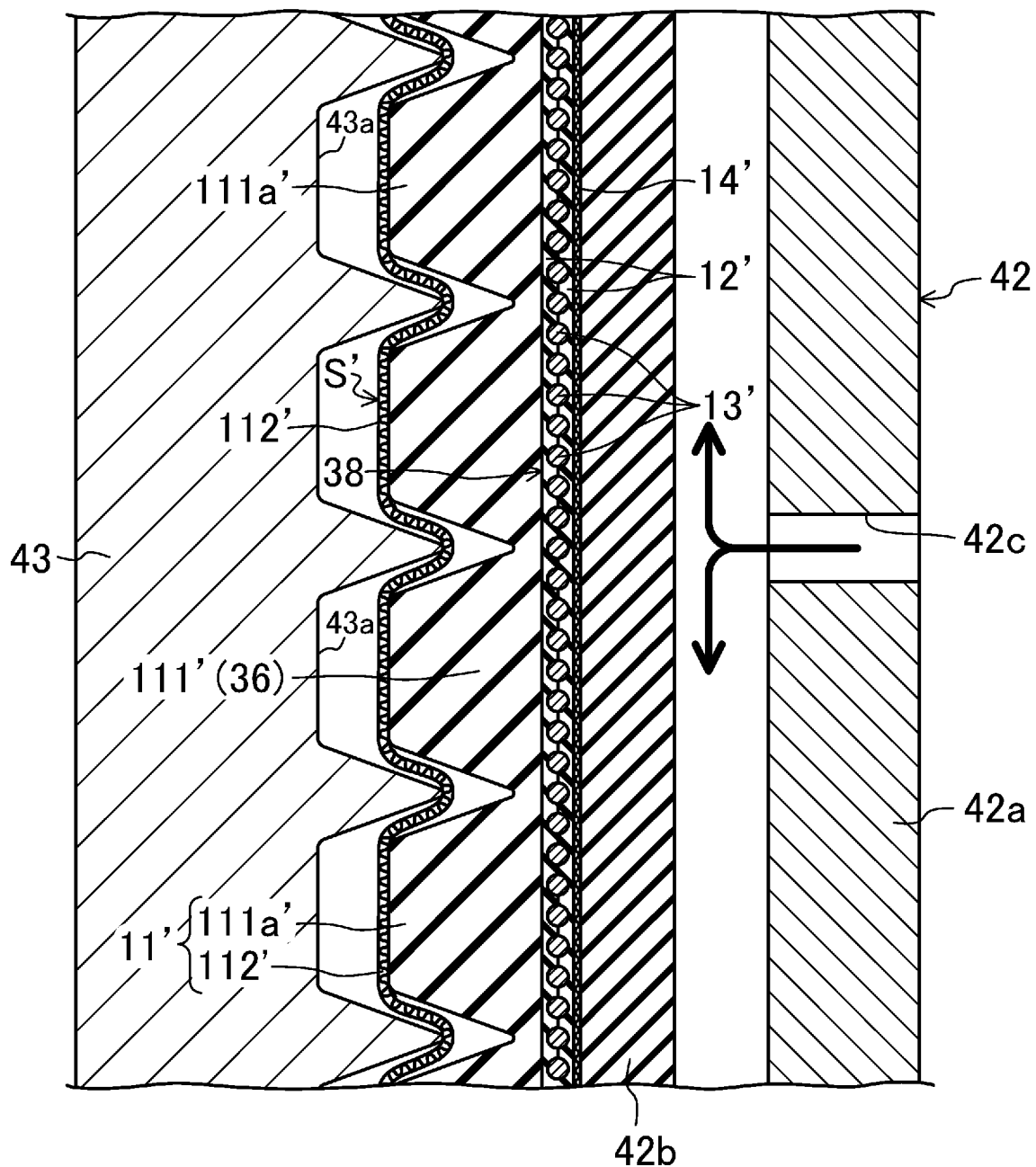
FIG. 16B is a second drawing showing the crosslinking step of the sixth production method.

A pressurizing means then introduces high-pressure air into the drum body 42a of the expansion drum 42 so as to expand the expansion sleeve 42b radially outwardly. After a predetermined pressure is reached, heating is begun. This state is then maintained for a predetermined period of time. At this moment, as shown in FIG. 16B, the uncrosslinked slab S' is pressed toward the cylindrical mold 43 by coming in contact with the expansion sleeve 42b which is expanded. That is, the pressing of the shaped structure 36 toward the cylindrical mold 43 is carried out by expanding the expansion sleeve 42b, located radially inward of the shaped structure 36, and pressing the shaped structure 36 from radially inside. The core rubber sheet 111' presses and stretches the fabric material 112', and is covered with the fabric material 112'. Further, each of the plurality of core rubber layer-forming portions 111a' of the core rubber sheet 111' enters an associated one of the compression layer-shaping grooves 43a of the cylindrical mold 43, while pressing and stretching the fabric material 112'. The core rubber layer-forming portion 111a' and the fabric material 112' covering the core rubber layer-forming portions 111a' together form the compression layer-forming portion 11' in the associated one of the compression layer-shaping grooves 43a. That is, the same state as in FIG. 6B illustrating the first production method is achievable at this stage. The uncrosslinked slab S' is heated by the cylindrical mold 43, while each of the compression layer-forming portions 11' (each of the core rubber layer-forming portions 111a' covered with the fabric material 112') is fitted in the associated one of the compression layer-shaping grooves 43a of the cylindrical mold 43. The rubber components of the core rubber sheet 111' and the adhesive rubber sheets 12' that are included in the uncrosslinked slab S' are crosslinked to be integrated with one another. As a result, a continuous structure of belt bodies 10 each including the core rubber layer 111 and the adhesive rubber layer 12 for a plurality of V-ribbed belts B is produced. At the same time, the rubber components adhere to, and are combined with, the fabric material 112', the cord 13', and the reinforcing fabric 14'. A cylindrical belt slab S is thus molded eventually.

The other features and advantages are the same as those of the first production method.

The sixth production method may be applied to the third production method. In such a case, using a crosslinking apparatus 40 which is similar to that of the third production method and includes an expansion drum 42 that is attachable to, and detachable from, a base 41, the expansion drum 42 may serve as a shaping mandrel 31 to produce the V-ribbed belt B of the embodiment.

(Seventh Production Method)

A seventh production method will be described below with reference to FIG. 17.

The seventh production method includes a shaping step in which a core rubber sheet 111' having a predetermined length is formed into a cylindrical shape with its ends joined together such that core rubber layer-forming portions 111a' face outside. As a result, a shaped structure 36 is produced which has a cylindrical shape, is made of an uncrosslinked rubber composition, and includes, on its outer peripheral surface, the plurality of core rubber layer-forming portions 111a' extending in the circumferential direction and arranged adjacent to one another in the axial direction of the shaped structure 36. The core rubber sheet 111' is cut with ultrasound, a cutter, scissors, or the like, and its ends are butt jointed. To increase the joint strength, the butt joint is suitably achieved by abutting surfaces, of the core rubber sheet 111', which are oblique with respect to the thickness direction of the core rubber sheet 111'.

Next, a fabric material 112' is wrapped around the shaped structure 36. At this moment, the fabric material 112' is wrapped to have a cylindrical shape, while being supported on the tops of the core rubber layer-forming portions 111a' of the shaped structure 36, and layered on the shaped structure 36. The fabric material 112' is cut with ultrasound, a cutter, scissors, or the like, and its ends are lap jointed together. Alternatively, a fabric material 112' having a predetermined length may be formed into a cylindrical shape with its both ends joined together, and this cylindrically-shaped fabric material 112' may be fitted over the shaped structure 36.

Further, in a manner as in FIGS. 4A to 4C illustrating the first production method, a reinforcing fabric 14', an adhesive rubber sheet 12', a cord 13', and another adhesive rubber sheet 12' are stacked on a shaping mandrel 31 in the stated order. After that, the entire peripheral surface of the stacked structure is pressed with a roller 32 on the adhesive rubber sheet 12' to integrate the stacked structure and produce a cylindrical tensile member 38.

Figure 17:
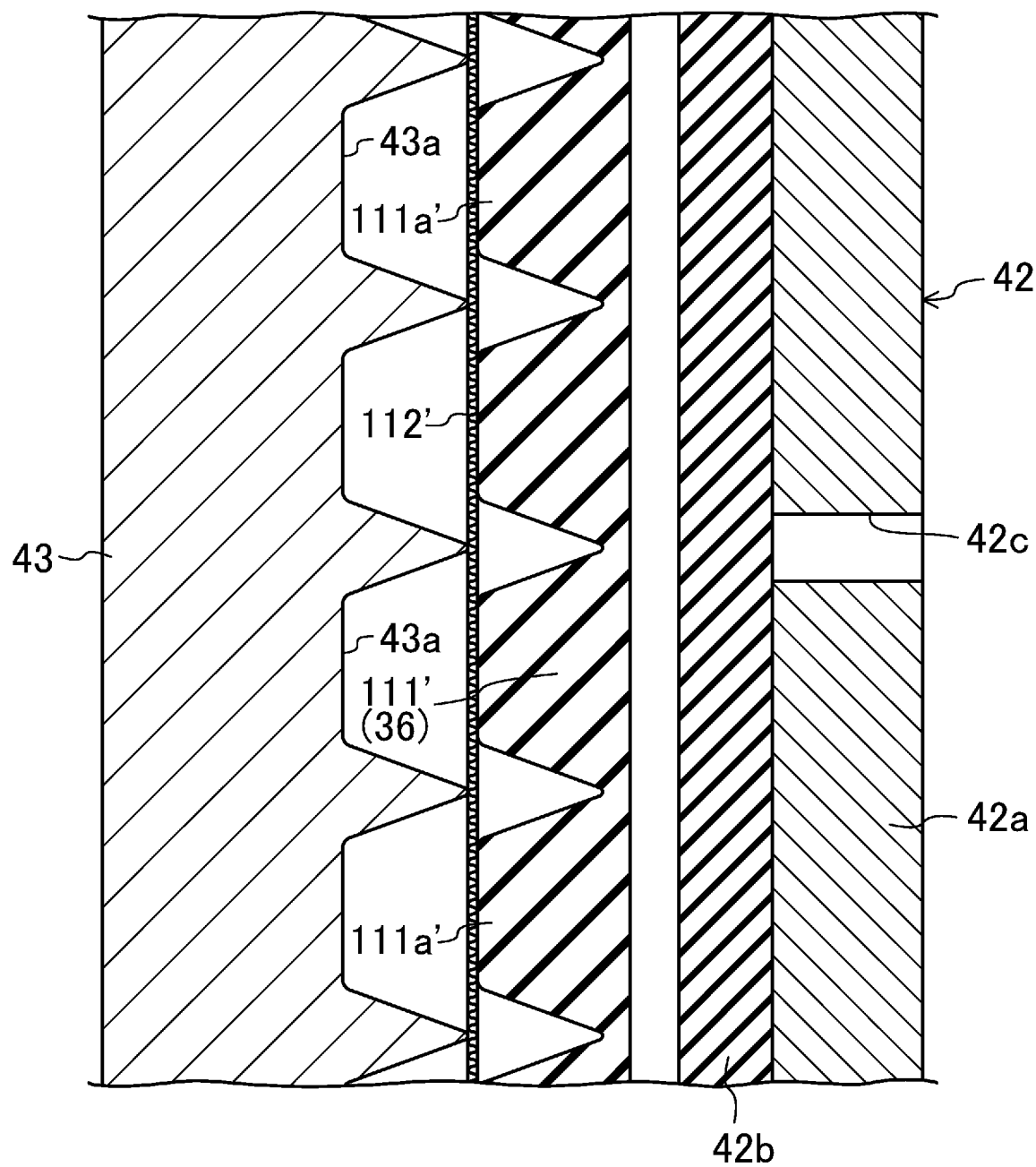
FIG. 17 shows a crosslinking step of a seventh production method.

As shown in FIG. 17, in a crosslinking step, the shaped structure 36 covered with the fabric material 112' is placed in the cylindrical mold 43 which has been removed from the base 41 of the crosslinking apparatus 40. More specifically, the shaped structure 36 covered with the fabric material 112' is set in the cylindrical mold 43 such that the outer peripheral surface of the fabric material 112' comes into contact with the cylindrical mold 43 at locations apart from each other in the axial direction, and that each of the plurality of core rubber layer-forming portions 111a' of the shaped structure 36 is positioned at the opening of an associated one of the compression layer-shaping grooves 43a of the cylindrical mold 43. At this time, the shaped structure 36 and the fabric material 112' are set in the cylindrical mold 43 such that the shaped structure 36 and the fabric material 112' are positioned respectively inside and outside with respect to each other. The core rubber layer-forming portions 111a' may press the fabric material 112' such that a portion of each core rubber layer-forming portion 111a' enters the associated one of the compression layer-shaping grooves 43a. The cylindrical mold 43 is chosen to correspond to the length of the V-ribbed belt B to be produced. Note that short fibers, resin powder, or the like may be attached to the inner peripheral surface of the cylindrical mold 43 and/or the outer peripheral surface of the fabric material 112' in advance.

The tensile member 38 is removed from the shaping mandrel 31, and is then fitted to the shaped structure 36 set in the cylindrical mold 43, such that the outer peripheral surface of the tensile member 38 comes into contact with the inner peripheral surface of the shaped structure 36, that is, so as to be in a positional relationship as in FIG. 16A illustrating the sixth production method. This means that the tensile member 38, which is comprised of an uncrosslinked rubber composition shaped into a cylindrical shape in which the cord 13' is embedded so as to form a helical pattern having pitches in the axial direction, is placed between the shaped structure 36 and the expansion sleeve 42b of the expansion drum 42. Before expansion of the expansion sleeve 42b, a gap is interposed between the tensile member 38 and the expansion sleeve 42b, and the shaped structure 36 and the tensile member 38 are in contact with each other.

The other features and advantages are the same as those of the sixth production method.

The seventh production method may be applied to the fourth production method. In such a case, using a crosslinking apparatus 40 which is similar to that of the fourth production method and includes an expansion drum 42 that is attachable to, and detachable from, a base 41, the expansion drum 42 may serve as a shaping mandrel 31 to produce the V-ribbed belt B of the embodiment.

In the embodiments described above, the uncrosslinked slab S' is crosslinked by using the cylindrical mold 43. However, the present disclosure is not particularly limited to this. For example, the uncrosslinked slab is suspended between two shafts, and a portion of the uncrosslinked slab is press molded between a flat-shaped mold and a plate-shaped belt mold having a plurality of compression layer-shaping grooves which are arranged adjacent to one another in the groove width direction. The uncrosslinked slab is crosslinked while being passed molded the circumferential direction.

What is claimed is:

1. A method for producing a V-ribbed belt including a compression layer which forms an inner peripheral portion of the V-ribbed belt in a thickness direction of the V-ribbed belt, and which has a plurality of V-shaped ribs extending in a longitudinal direction of the V-ribbed belt and arranged in a width direction of the V-ribbed belt, the plurality of V-shaped ribs having a friction drive surface covered with a covering fabric, the method comprising:
    forming a shaped structure having a cylindrical shape, being made of an uncrosslinked rubber composition, and including, on an outer peripheral surface thereof, a plurality of ridges extending in a circumferential direction and arranged adjacent to one another in an axial direction of the shaped structure;
    after formation of the ridges, forming compression layer-forming portions, which are to constitute the V-shaped ribs, by covering the previously formed ridges with a fabric material, which is to constitute the covering fabric;
    molding a cylindrical belt slab by using a belt mold including a plurality of compression layer-shaping grooves arranged in a groove width direction, and by crosslinking the shaped structure, which has been formed in the forming the shaped structure, through heating and pressing the shaped structure toward the belt mold, while each of the compression layer-forming portions, which have been formed in the forming the compression layer-forming portions, is fitted in an associated one of the compression layer-shaping grooves of the belt mold, the crosslinking involving integration of the shaped structure with the fabric material; and
    cutting the belt slab into ring-shaped pieces each including two or more of the plurality of compression layer-forming portions that are to constitute the plurality of V-shaped ribs.

2. The method of claim 1, wherein
the belt mold has a cylindrical shape having, on an inner peripheral surface thereof, the plurality of compression layer-shaping grooves extending in a circumferential direction and arranged adjacent to one another in an axial direction of the belt mold, and
the shaped structure is placed in the belt mold.

3. The method of claim 1, wherein
prior to the molding the belt slab, the ridges are covered with the fabric material, thereby forming the compression layer-forming portions.

4. The method of claim 3, wherein
before the ridges are covered with the fabric material, the fabric material is shaped to have a corrugated cross section having same pitches as those of the ridges, and then, disposed such that portions of the fabric material protruding toward the ridges are positioned at grooves between the ridges.

5. The method of claim 4, wherein
the fabric material which originally has a flat shape is continuously passed between a pair of plate-shaped or rolled members configured to pleat the fabric material, so that pitches of the fabric material pleated gradually decrease in a length direction.

6. The method of claim 3, wherein
before the ridges are covered with the fabric material, the fabric material is shaped to fit surfaces of the ridges.

7. The method of claim 1, further comprising:
setting the shaped structure and the fabric material in the belt mold such that the compression layer-forming portions are fitted in the compression layer-shaping grooves.

8. The method of claim 2, wherein
the shaped structure is pressed toward the belt mold by expanding an expansion sleeve disposed inward of the shaped structure and by causing the expansion sleeve to press the shaped structure from inside.

9. The method of claim 8, wherein
a tensile member is provided between the shaped structure and the expansion sleeve, the tensile member being comprised of an uncrosslinked rubber composition different from the shaped structure, formed into a cylindrical shape, and having a cord embedded therein and forming a helical pattern with pitches in an axial direction of the tensile member.

10. The method of claim 9, wherein
the tensile member is provided on the expansion sleeve before the expansion sleeve is expanded.

11. The method of claim 9, wherein
a gap is provided between the tensile member and the expansion sleeve before the expansion sleeve is expanded.

12. The method of claim 10, wherein
the shaped structure and the tensile member are brought into contact with each other before the expansion sleeve is expanded.

13. The method of claim 10, wherein
a gap is provided between the shaped structure and the tensile member before the expansion sleeve is expanded.

14. The method of claim 2, wherein
the fabric material is in contact with the inner peripheral surface of the belt mold prior to the pressing the shaped structure toward the belt mold.

15. The method of claim 14, wherein
the fabric material is in contact with the inner peripheral surface of the belt mold at locations apart from each other in the axial direction of the belt mold.

16. A method for producing a V-ribbed belt including a compression layer which forms an inner peripheral portion of the V-ribbed belt in a thickness direction of the V-ribbed belt, and which has a plurality of V-shaped ribs extending in a longitudinal direction of the V-ribbed belt and arranged in a width direction of the V-ribbed belt, the plurality of V-shaped ribs having a friction drive surface covered with a covering fabric, the method comprising:
- forming a rubber sheet of an uncrosslinked rubber composition, the rubber sheet including a plurality of ridges extending parallel to, and adjacent to, one another,
- forming compression layer-forming portions, which are to constitute the V-shaped ribs, by covering the ridges of the rubber sheet, which has been formed in the forming the rubber sheet, with a fabric material which is to constitute the covering fabric;
- forming a shaped structure from the rubber sheet including the compression layer-forming portions, which have been formed in the forming the compression layer-forming portions and are comprised of the ridges of the rubber sheet covered with the fabric material that is to constitute the covering fabric, the shaped structure having a cylindrical shape and including, on an outer peripheral surface thereof, the compression layer-forming portions extending in a circumferential direction and arranged adjacent to one another in an axial direction of the shaped structure,
- molding a cylindrical belt slab by using a belt mold including a plurality of compression layer-shaping grooves arranged in a groove width direction, and by crosslinking the shaped structure, which has been formed in the forming the shaped structure, through heating and pressing the shaped structure toward the belt mold, while each of the compression layer-forming portions, which have been formed in the forming the compression layer-forming portions, is fitted in an associated one of the compression layer-shaping grooves of the belt mold, the crosslinking involving integration of the shaped structure with the fabric material; and
- cutting the belt slab into ring-shaped pieces each including two or more of the plurality of compression layer-forming portions that are to constitute the plurality of V-shaped ribs.

17. The method of claim 16, wherein
the belt mold has a cylindrical shape including, on an inner peripheral surface thereof, the plurality of compression layer-shaping grooves extending in a circumferential direction and arranged adjacent to one another in an axial direction of the belt mold, and
the shaped structure is placed in the belt mold.

18. The method of claim 17, wherein
the fabric material is in contact with the inner peripheral surface of the belt mold prior to the pressing the shaped structure toward the belt mold.

19. A method for producing a V-ribbed belt including a compression layer which forms an inner peripheral portion of the V-ribbed belt in a thickness direction of the V-ribbed belt, and which has a plurality of V-shaped ribs extending in a longitudinal direction of the V-ribbed belt and arranged in a width direction of the V-ribbed belt, the plurality of V-shaped ribs having a friction drive surface covered with a covering fabric, the method comprising:
- setting a shaped structure and a fabric material which is to constitute the covering fabric in a belt mold such that the shaped structure and the fabric material are respectively positioned inside and outside with respect to each other, the shaped structure having a cylindrical shape, being made of an uncrosslinked rubber composition, and including, on an outer peripheral surface thereof, a plurality of ridges extending in a circumferential direction and arranged adjacent to one another in an axial direction of the shaped structure, the belt mold including a plurality of compression layer-shaping grooves arranged in a groove width direction;
- molding a cylindrical belt slab by crosslinking the shaped structure set in the belt mold through heating and pressing the shaped structure toward the belt mold, while each of compression layer-forming portions is fitted in an associated one of the compression layer-shaping grooves of the belt mold, the compression layer-forming portions being comprised of the plurality of ridges, of the shaped structure, each covered with the fabric material and together forming the compression layer, the crosslinking involving integration of the shaped structure with the fabric material; and
- cutting the belt slab into ring-shaped pieces each including two or more of the plurality of compression layer-forming portions that are to constitute the plurality of V-shaped ribs, wherein
- prior to the setting the shaped structure and the fabric material in the belt mold, the ridges are covered with the fabric material, thereby forming the compression layer-forming portions, and
- before the ridges are covered with the fabric material, the fabric material is shaped to have a corrugated cross section having same pitches as those of the ridges, and then, disposed such that portions of the fabric material protruding toward the ridges are positioned at grooves between the ridges.

20. A method for producing a V-ribbed belt including a compression layer which forms an inner peripheral portion of the V-ribbed belt in a thickness direction of the V-ribbed belt, and which has a plurality of V-shaped ribs extending in a longitudinal direction of the V-ribbed belt and arranged in a width direction of the V-ribbed belt, the plurality of V-shaped ribs having a friction drive surface covered with a covering fabric, the method comprising:
- setting a shaped structure and a fabric material which is to constitute the covering fabric in a belt mold such that the shaped structure and the fabric material are respectively positioned inside and outside with respect to each other, the shaped structure having a cylindrical shape, being made of an uncrosslinked rubber composition, and including, on an outer peripheral surface thereof, a plurality of ridges extending in a circumferential direction and arranged adjacent to one another in an axial direction of the shaped structure, the belt mold including a plurality of compression layer-shaping grooves arranged in a groove width direction;
- molding a cylindrical belt slab by crosslinking the shaped structure set in the belt mold through heating and pressing the shaped structure toward the belt mold, while each of compression layer-forming portions is fitted in an associated one of the compression layer-shaping grooves of the belt mold, the compression layer-forming portions being comprised of the plurality of ridges, of the shaped structure, each covered with the fabric material and together forming the compression layer, the crosslinking involving integration of the shaped structure with the fabric material; and
- cutting the belt slab into ring-shaped pieces each including two or more of the plurality of compression layer-forming portions that are to constitute the plurality of V-shaped ribs, wherein
- prior to the setting the shaped structure and the fabric material in the belt mold, the ridges are covered with the fabric material, thereby forming the compression layer-forming portions, and before the ridges are covered with the fabric material, the fabric material is shaped to fit surfaces of the ridges.

21. A method for producing a V-ribbed belt including a compression layer which forms an inner peripheral portion of the V-ribbed belt in a thickness direction of the V-ribbed belt, and which has a plurality of V-shaped ribs extending in a longitudinal direction of the V-ribbed belt and arranged in a width direction of the V-ribbed belt, the plurality of V-shaped ribs having a friction drive surface covered with a covering fabric, the method comprising:

setting a shaped structure and a fabric material which is to constitute the covering fabric in a belt mold such that the shaped structure and the fabric material are respectively positioned inside and outside with respect to each other, the shaped structure having a cylindrical shape, being made of an uncrosslinked rubber composition, and including, on an outer peripheral surface thereof, a plurality of ridges extending in a circumferential direction and arranged adjacent to one another in an axial direction of the shaped structure, the belt mold including a plurality of compression layer-shaping grooves arranged in a groove width direction;

molding a cylindrical belt slab by crosslinking the shaped structure set in the belt mold through heating and pressing the shaped structure toward the belt mold, while each of compression layer-forming portions is fitted in an associated one of the compression layer-shaping grooves of the belt mold, the compression layer-forming portions being comprised of the plurality of ridges, of the shaped structure, each covered with the fabric material and together forming the compression layer, the crosslinking involving integration of the shaped structure with the fabric material; and cutting the belt slab into ring-shaped pieces each including two or more of the plurality of compression layer-forming portions that are to constitute the plurality of V-shaped ribs, wherein the belt mold has a cylindrical shape including, on an inner peripheral surface thereof, the plurality of compression layer-shaping grooves extending in a circumferential direction and arranged adjacent to one another in an axial direction of the belt mold, the shaped structure is placed in the belt mold, the shaped structure is pressed toward the belt mold by expanding an expansion sleeve disposed inward of the shaped structure and by causing the expansion sleeve to press the shaped structure from inside, a tensile member is provided between the shaped structure and the expansion sleeve, the tensile member being comprised of an uncrosslinked rubber composition formed into a cylindrical shape and having a cord embedded therein and forming a helical pattern with pitches in an axial direction of the tensile member, the tensile member is provided on the expansion sleeve before the expansion sleeve is expanded, and a gap is provided between the tensile member and the expansion sleeve before the expansion sleeve is expanded.

22. A method for producing a V-ribbed belt including a compression layer which forms an inner peripheral portion of the V-ribbed belt in a thickness direction of the V-ribbed belt, and which has a plurality of V-shaped ribs extending in a longitudinal direction of the V-ribbed belt and arranged in a width direction of the V-ribbed belt, the plurality of V-shaped ribs having a friction drive surface covered with a covering fabric, the method comprising:

setting a shaped structure and a fabric material which is to constitute the covering fabric in a belt mold such that the shaped structure and the fabric material are respectively positioned inside and outside with respect to each other, the shaped structure having a cylindrical shape, being made of an uncrosslinked rubber composition, and including, on an outer peripheral surface thereof, a plurality of ridges extending in a circumferential direction and arranged adjacent to one another in an axial direction of the shaped structure, the belt mold having a cylindrical shape including, on an inner peripheral surface thereof, a plurality of compression layer-shaping grooves extending in a circumferential direction and arranged adjacent to one another in an axial direction of the belt mold;

molding a cylindrical belt slab by crosslinking the shaped structure set in the belt mold through heating and pressing the shaped structure toward the belt mold, while each of compression layer-forming portions is fitted in an associated one of the compression layer-shaping grooves of the belt mold, the compression layer-forming portions being comprised of the plurality of ridges, of the shaped structure, each covered with the fabric material and together forming the compression layer, the crosslinking involving integration of the shaped structure with the fabric material; and cutting the belt slab into ring-shaped pieces each including two or more of the plurality of compression layer-forming portions that are to constitute the plurality of V-shaped ribs, wherein the shaped structure is pressed toward the belt mold by expanding an expansion sleeve disposed inward of the shaped structure and by causing the expansion sleeve to press the shaped structure from inside, a tensile member is provided between the shaped structure and the expansion sleeve, the tensile member being comprised of an uncrosslinked rubber composition formed into a cylindrical shape and having a cord embedded therein and forming a helical pattern with pitches in an axial direction of the tensile member, the tensile member is provided on the expansion sleeve before the expansion sleeve is expanded, and the shaped structure and the tensile member are brought into contact with each other before the expansion sleeve is expanded.

* * * * *